United States Patent
O'Donnell et al.

(10) Patent No.: US 11,567,552 B2
(45) Date of Patent: *Jan. 31, 2023

(54) SYSTEMS AND METHODS FOR GENERATING A VISUAL COLOR DISPLAY OF AUDIO-FILE DATA

(71) Applicant: inMusic Brands, Inc., Cumberland, RI (US)

(72) Inventors: John O'Donnell, Fort Lauderdale, FL (US); Christopher Blane Roman, Wrentham, MA (US); James Samuel Heintz, San Luis Obispo, CA (US); Lindsey Ryan Cole, Brooklyn, NY (US); Manuel Kaletta, Oldenburg (DE); Vincent Ming Chen, Bremen (DE); Marcus Tillmans, Bremen (DE)

(73) Assignee: inMusic Brands, Inc., Cumberland, RI (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/085,002

(22) Filed: Oct. 30, 2020

(65) Prior Publication Data

US 2021/0048868 A1 Feb. 18, 2021

Related U.S. Application Data

(63) Continuation of application No. 16/476,488, filed as application No. PCT/US2018/012676 on Jan. 5, 2018, now Pat. No. 10,970,033.

(Continued)

(51) Int. Cl.
*G06F 1/30* (2006.01)
*G06F 9/451* (2018.01)
(Continued)

(52) U.S. Cl.
CPC .............. *G06F 1/30* (2013.01); *G06F 3/0362* (2013.01); *G06F 3/044* (2013.01); *G06F 3/0481* (2013.01);
(Continued)

(58) Field of Classification Search
CPC ...... G06F 9/451; G06F 16/683; G06F 3/0362; G06F 3/044; G06F 3/0481; G06F 3/0482;
(Continued)

(56) References Cited

U.S. PATENT DOCUMENTS 8,311,656 B2 * 11/2012 Carrier ................. G11B 27/005
700/94
8,618,404 B2 * 12/2013 O'Dwyer ................. G10H 1/40
84/645

(Continued)

FOREIGN PATENT DOCUMENTS

WO 2013030863 A1 3/2013
WO WO-2013030863 A1 * 3/2013 ............... G10G 1/00
(Continued)

OTHER PUBLICATIONS

Bauer et al., "Traktor2", Application Reference, Apr. 30, 2011, https://www.strumentimusicali.net/manuali/NATIVEINSTRUMENTS_TRAKTOR2_ENG.pdf, entire document (Year: 2011).*

(Continued)

*Primary Examiner* — Christina M Schreiber
(74) *Attorney, Agent, or Firm* — ArentFox Schiff LLP

(57) ABSTRACT

Systems and methods for generating a visual color display of audio-file data are provided. The system includes a processor that performs a method including receiving audio-file data; generating filtered-audio data by processing the audio-file data by frequency-band filters. The frequency band filters have different frequency bands. The method includes generating one or more waveforms corresponding to the (Continued)

filtered-audio data and displaying the waveforms superimposed in unique color relative to one another. The method includes downsampling the waveforms. The method includes processing the waveforms through an envelope detector. The method includes processing the waveforms through an expander and applying a gain factor. The waveforms have transparency levels at sections that are proportional or inversely proportional to amplitudes at the sections.

23 Claims, 27 Drawing Sheets

Related U.S. Application Data

(60) Provisional application No. 62/444,219, filed on Jan. 9, 2017.

(51) Int. Cl.

| | |
|---|---|
| *G06F 3/0482* | (2013.01) |
| *G06F 3/04847* | (2022.01) |
| *G06F 3/04886* | (2022.01) |
| *G06F 3/16* | (2006.01) |
| *G10H 1/00* | (2006.01) |
| *G10H 1/12* | (2006.01) |
| *G10H 1/40* | (2006.01) |
| *G06F 3/044* | (2006.01) |
| *G06F 3/0488* | (2022.01) |
| *G06F 3/0481* | (2022.01) |
| *G06F 3/04883* | (2022.01) |
| *G06F 3/0362* | (2013.01) |
| *G06F 3/14* | (2006.01) |
| *G06F 16/683* | (2019.01) |
| *G06F 1/28* | (2006.01) |
| *G11B 27/00* | (2006.01) |
| *G11B 27/031* | (2006.01) |
| *G11B 27/10* | (2006.01) |
| *G10L 21/043* | (2013.01) |
| *G10L 21/04* | (2013.01) |

(52) U.S. Cl.
CPC .......... *G06F 3/0482* (2013.01); *G06F 3/0488* (2013.01); *G06F 3/04847* (2013.01); *G06F 3/04883* (2013.01); *G06F 3/04886* (2013.01); *G06F 3/1423* (2013.01); *G06F 3/165* (2013.01); *G06F 9/451* (2018.02); *G06F 16/683* (2019.01); *G10H 1/0008* (2013.01); *G10H 1/0066* (2013.01); *G10H 1/12* (2013.01); *G10H 1/40* (2013.01); *G10L 21/04* (2013.01); *G10L 21/043* (2013.01); *G11B 27/005* (2013.01); *G11B 27/031* (2013.01); *G11B 27/105* (2013.01); *G06F 1/28* (2013.01); *G10H 2210/076* (2013.01); *G10H 2210/125* (2013.01); *G10H 2210/241* (2013.01); *G10H 2210/381* (2013.01); *G10H 2220/116* (2013.01); *G10H 2220/126* (2013.01); *G10H 2250/641* (2013.01)

(58) Field of Classification Search
CPC .............. G06F 3/04847; G06F 3/0488; G06F 3/04883; G06F 3/04886; G06F 3/1423; G06F 3/165; G06F 1/28; G10H 1/0008; G10H 1/0066; G10H 1/12; G10H 1/40; G10H 2210/076; G10H 2210/125; G10H 2210/241; G10H 2210/381; G10H 2220/116; G10H 2220/126; G10H 2250/641; G10L 21/04; G10L 21/043; G11B 27/005; G11B 27/031; G11B 27/105

USPC .......................................................... 84/603
See application file for complete search history.

(56) References Cited

U.S. PATENT DOCUMENTS

| | | | |
|---|---|---|---|
| 8,793,580 B2 * | 7/2014 | Robinson | G11B 33/10 715/716 |
| 9,445,210 B1 * | 9/2016 | Moorer | H04R 29/008 |
| 10,048,928 B2 * | 8/2018 | Heiniger | G06F 3/165 |
| 10,970,033 B2 * | 4/2021 | O'Donnell | G06F 3/0362 |
| 2004/0264917 A1 * | 12/2004 | Braun | G10H 1/368 |
| 2006/0181968 A1 * | 8/2006 | Yamada | G10H 1/0091 |
| 2010/0014390 A1 * | 1/2010 | Flum | G11B 27/105 369/4 |
| 2010/0132536 A1 * | 6/2010 | O'Dwyer | G10H 1/40 700/94 |
| 2011/0295397 A1 * | 12/2011 | Goldberg | G10H 1/0025 700/94 |
| 2013/0131850 A1 * | 5/2013 | Carrier | G11B 27/005 700/94 |
| 2014/0304598 A1 * | 10/2014 | Robinson | G06F 3/165 715/716 |
| 2015/0348585 A1 * | 12/2015 | Pisula | G06F 16/60 700/94 |
| 2015/0351651 A1 * | 12/2015 | Chen | A61B 5/316 600/382 |
| 2017/0221464 A1 * | 8/2017 | Ohta | G06F 3/011 |
| 2018/0052922 A1 * | 2/2018 | Tait | G06F 16/60 |
| 2018/0267772 A1 * | 9/2018 | Lee | G10H 1/46 |
| 2019/0377539 A1 * | 12/2019 | O'Donnell | G11B 27/105 |
| 2019/0378481 A1 * | 12/2019 | O'Donnell | G06F 3/04886 |
| 2019/0391785 A1 * | 12/2019 | O'Donnell | G06F 3/04847 |
| 2020/0005745 A1 * | 1/2020 | O'Donnell | G06F 3/0482 |
| 2020/0020350 A1 * | 1/2020 | O'Donnell | G06F 3/04886 |
| 2020/0057598 A1 * | 2/2020 | O'Donnell | G10H 1/40 |
| 2020/0057599 A1 * | 2/2020 | O'Donnell | G10H 1/0066 |
| 2021/0048868 A1 * | 2/2021 | O'Donnell | G06F 3/1423 |
| 2021/0279029 A1 * | 9/2021 | O'Donnell | G06F 3/0482 |
| 2021/0279030 A1 * | 9/2021 | Morsy | H04R 3/12 |
| 2021/0405958 A1 * | 12/2021 | O'Donnell | G06F 3/0481 |
| 2021/0407484 A1 * | 12/2021 | O'Donnell | G06F 3/04886 |

FOREIGN PATENT DOCUMENTS

| | | | | |
|---|---|---|---|---|
| WO | WO-2018129388 A1 * | 7/2018 | | G06F 1/30 |
| WO | WO-2021069630 A1 * | 4/2021 | | G10H 1/02 |

OTHER PUBLICATIONS

Bauer et al., "Traktor 2", Aplication Reference, Apr. 30, 2011, https://www.strurnentimusicali.net/manuali/NATIVEINSTRUMENTS TRAKTOR2 ENG.pdf, entire document.

* cited by examiner

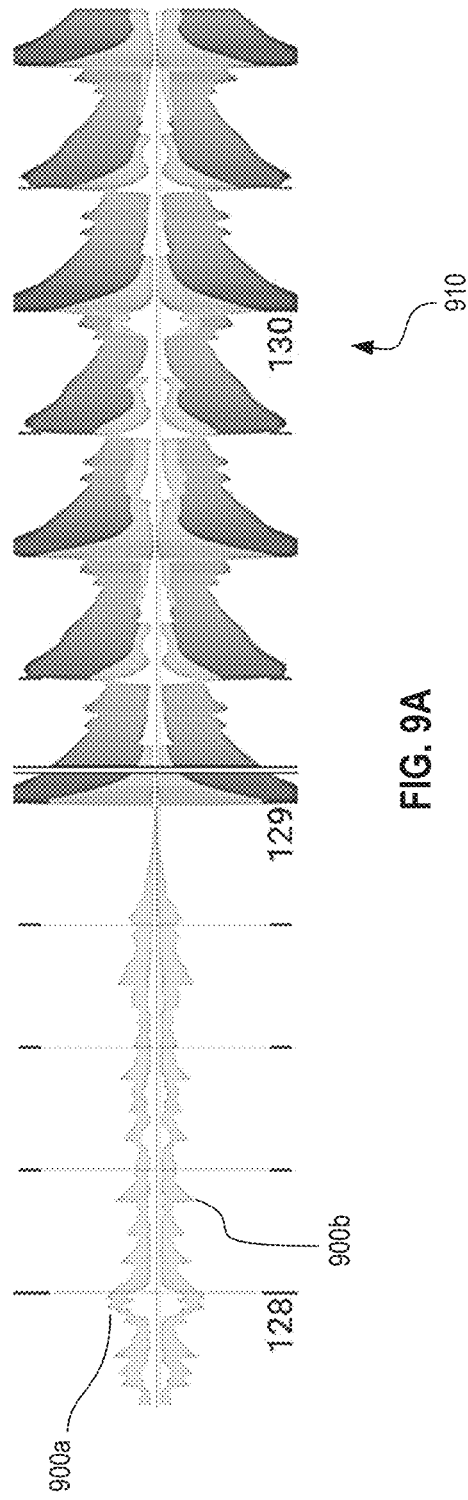
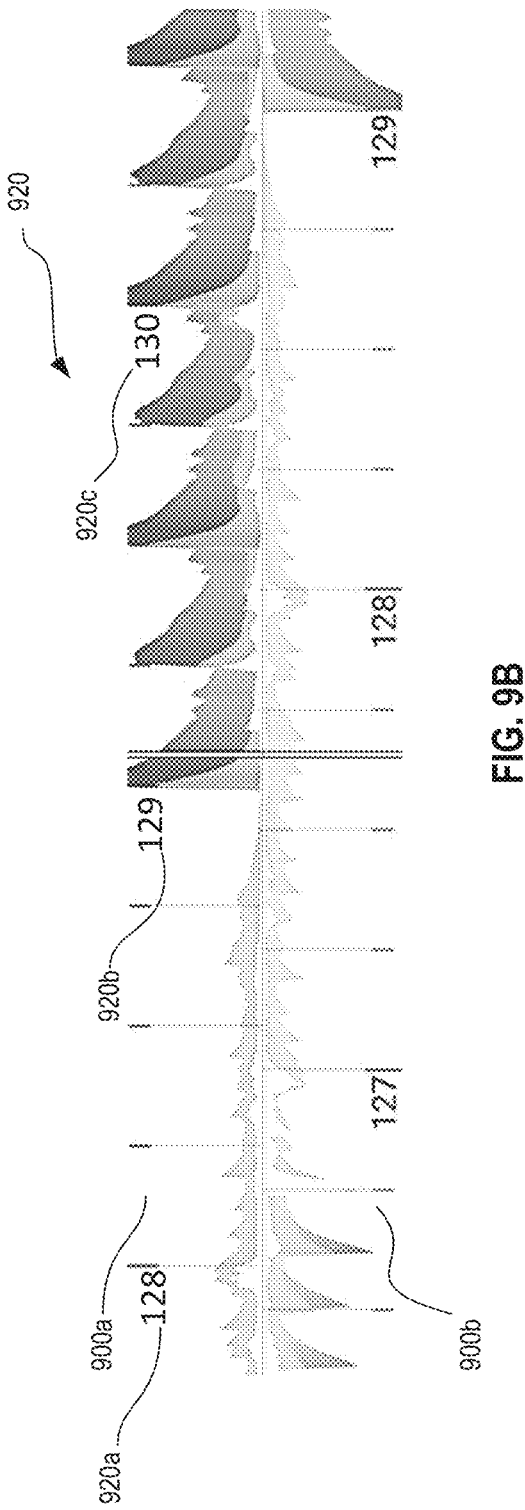
FIG. 9A
FIG. 9B

SYSTEMS AND METHODS FOR GENERATING A VISUAL COLOR DISPLAY OF AUDIO-FILE DATA

PRIORITY CLAIM

This application claims priority from U.S. Provisional Patent Application No. 62/444,219, filed on Jan. 9, 2017, which is hereby incorporated by reference in its entirety in the present application.

TECHNICAL FIELD

The present disclosure relates generally to systems and methods for generating a visual color display of audio-file data.

BACKGROUND

Professional and consumer audio equipment may be operated to manipulate audio-track playback. For example, disk jockeys ("DJs") can use the equipment to manipulate audio-track playback by, for example, reversing playback; increasing or decreasing playback speed; and repeating or looping portions of an audio track. The equipment may be used to analyze audio tracks and audio-track playback. DJs use the equipment to analyze an audio track to view information about the audio track and audio-track playback. For example, DJs can use the equipment to view the tempo of the track; the track, artist, and album name; the track key signature: how much of the track has already played; and how much of the track remains to be played. DJs use the equipment to view a waveform representing changes in the audio track's sound-pressure level at different frequencies with time.

The disclosed systems and methods are directed to overcoming one or more of the problems set forth above and/or other problems or shortcomings in the prior art.

BRIEF DESCRIPTION OF THE DRAWINGS

The accompanying drawings, which are incorporated in to and constitute a part of this specification, illustrate the disclosed embodiments and, together with the description, serve to explain the principles of the various aspects of the disclosed embodiments. In the drawings:

FIG. 9A illustrates an exemplary full waveform;
FIG. 9B illustrates another exemplary waveform.

It is to be understood that both the foregoing general descriptions and the following detailed descriptions are exemplary and explanatory only and are not restrictive of the claims

DESCRIPTION OF EXEMPLARY EMBODIMENTS

Reference will now be made to certain embodiments consistent with the present disclosure, examples of which are illustrated in the accompanying drawings. Wherever possible, the same reference numbers will be used throughout the drawings to refer to same or like parts.

The present disclosure describes systems and methods for generating a visual color display of audio-file data.

Figure 1:
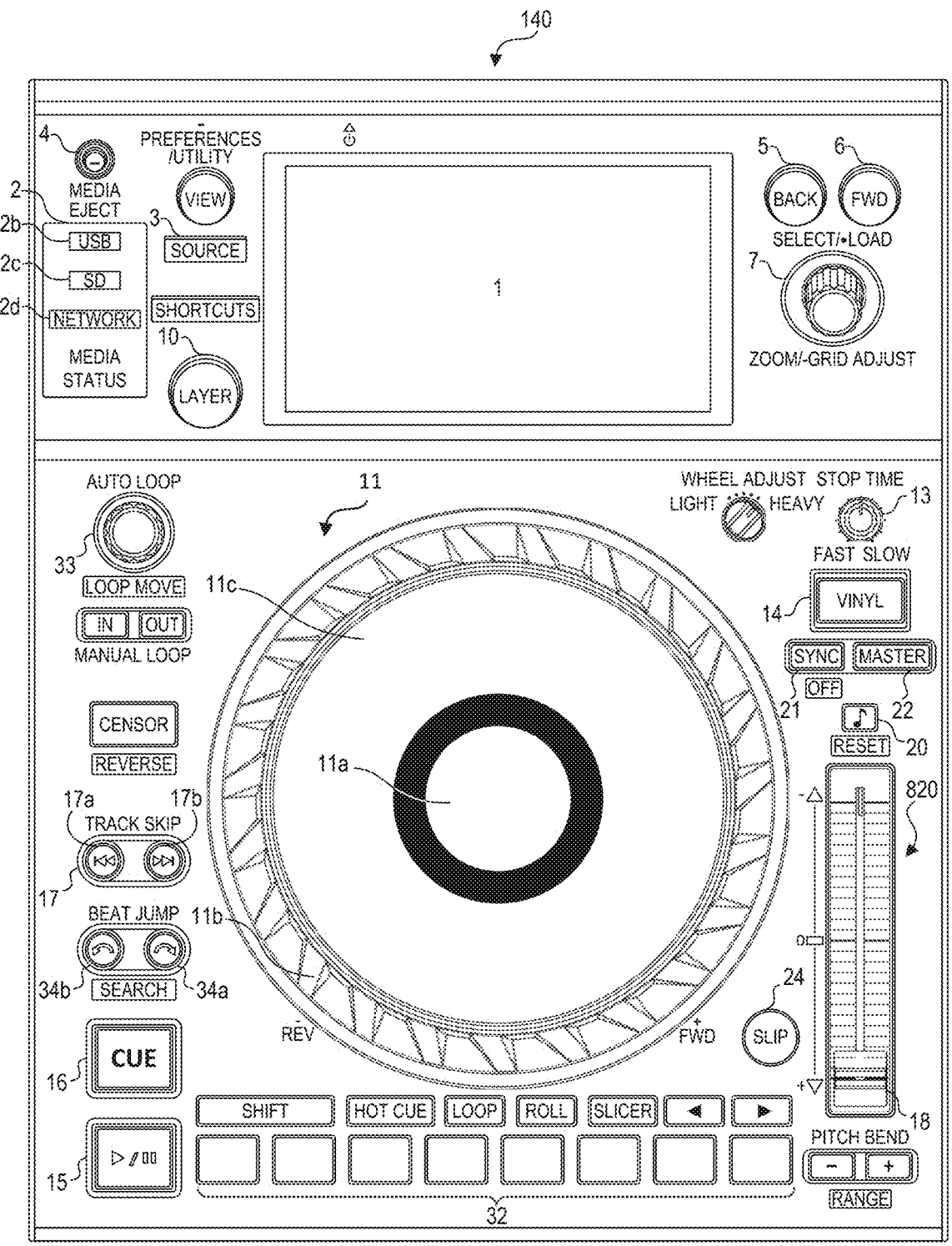
FIG. 1 illustrates an exemplary media player.

FIG. 1 shows one illustrative embodiment of a media player generally at 140. Media player 140 includes a display 1. Display 1 shows information relevant to media player's 140 current operating state. Display 1 may be full-color. Display 1 may be a touchscreen, such as a multi-touch display. Display 1 and/or other hardware controls may be used to control media player 140. Other hardware controls, such as, for example, buttons or knobs, may be used to make selections from display 1. For example, in certain embodiments, back-button 5 is used to show a prior view on display 1. Forward-button 6 is used to advance to a next view on display 1.

Media player 140 comprises a select/load-knob 7, which is used to zoom in or zoom out of a waveform (e.g., an audio-track waveform) being displayed on display 1. In certain embodiments, select/load-knob 7 is used to scroll through lists visualized on display 1. Such scrolling may highlight one or more elements of a list at a time. The speed of the scrolling may be determined by a velocity algorithm that receives an input generated by rotating select/load-knob 7. In some embodiments, the speed of the scrolling per unit of rotation may be increased or decreased by first pressing or pressing and holding another button on media player 140. Select/load-knob 7 is pressed to select highlighted one or more items.

Figure 5:
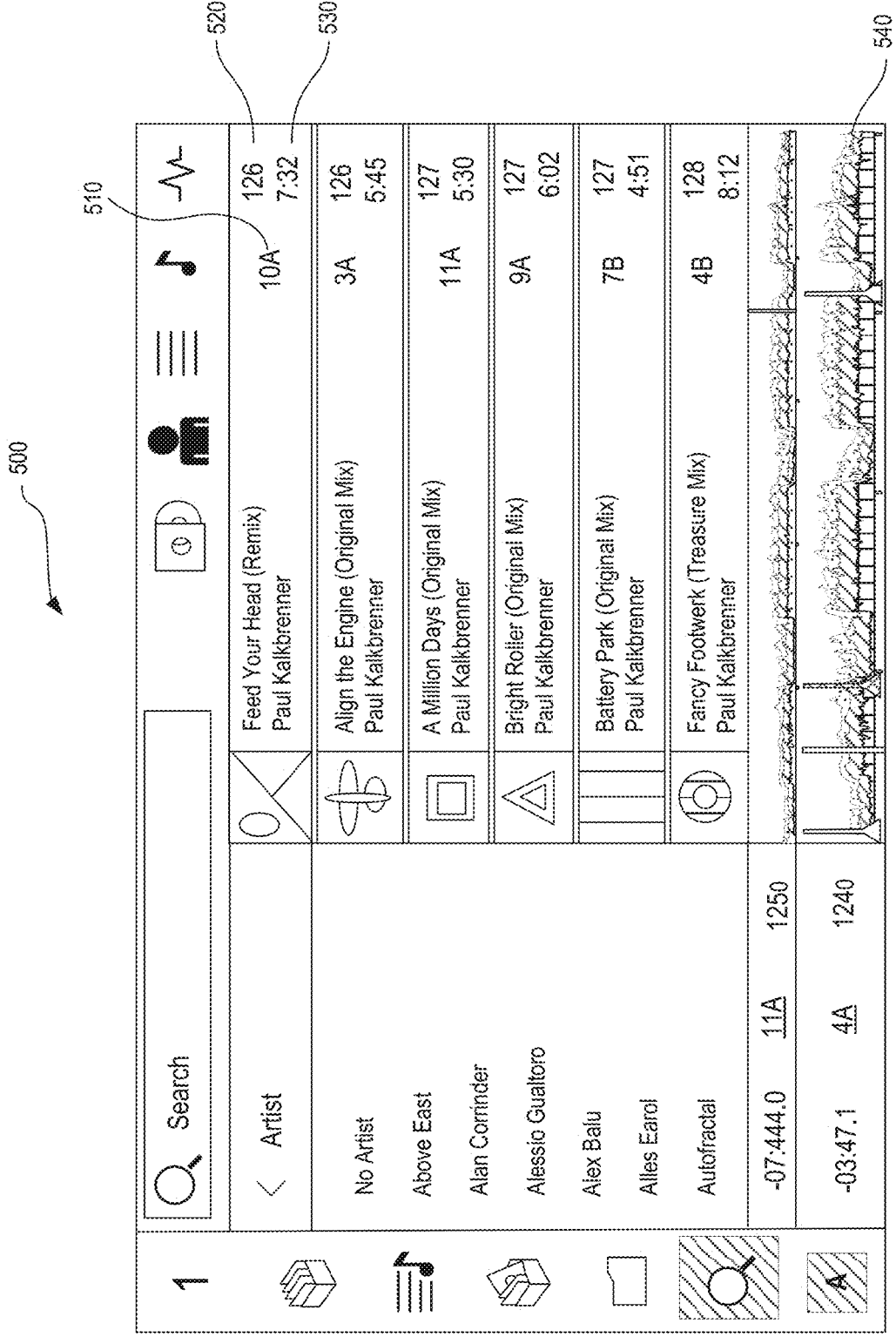
FIG. 5 illustrates an exemplary display.

Media player 140 analyzes a selected audio track and stores results of the analysis in a catalog of audio-track metadata. The analysis may comprise determining, for example, the audio-track tempo, the audio-track key, audio-track downbeat locations, and/or the audio-track beat locations. A user views the metadata on a display such as exemplary display 500, illustrated in FIG. 5. For example, the user may view musical key 510 (e.g., displayed with standard key notation, numeric key positions, colorized font to indicate similar keys, or any combination thereof), tempo 520, track length 530, and/or waveform 540 for a particular audio track.

Media player 140 includes media-selection indicators 2b, 2c, and/or 2d in media-selection indicator section 2. The media-selection indicators 2b, 2c, and/or 2d indicate where an audio track is stored. For example, media-selection indicator 2b may be a light-emitting diode ("LED") that lights up if an audio track stored on an inserted SD card is played. Media-selection indicator 2c may be an LED that lights up if an audio track stored on a connected USB drive is played. Media-selection indicator 2d may be an LED that lights up if an audio track stored on a connected network device is played.

Media player 140 displays a list of available devices from which to play music. Such display can be visualized on display 1 by pressing, for example, source-button 3. The list may include, for example, one or more other media players, one or more USB drives, and/or one or more SD cards. A user selects a device listed on display 1 by, for example, tapping the display where it lists the device.

Media player 140 prepares itself for safe disconnection from other electronic devices. This includes ensuring that one or more files stored on removable memory are not being accessed during disconnection to prevent corruption of the one or more files. To accomplish this, media player 140 displays a list of available devices from which files may be accessed. Such display is visualized on display 1 by pressing, for example, media-eject button 4. A user then selects the device the user wishes to disconnect. Such device is selected by making a sustained contact with one's finger with the portion of display 1 displaying the device name. Display 1 removes the device from the list when media player 140 has finished preparing itself for safe disconnection from the electronic device. Examples of electronic devices include, but are not limited to, one or more USB drives, one or more SD cards, and one or more other media players.

Media player 140 controls the playback or otherwise manipulates a first audio track while playing a second audio track. The first audio track and the second audio track may be said to be on different "layers" or "decks" and one or more controls on media player 140 may be used to selectively control one or more audio tracks on one or more layers. Layer-button 10 may be pressed to change which layer or layers one or more controls on media player 140 will operate on.

Media player 140 has a play/pause-button 15 which, when pressed, causes media player 140 to play a currently paused audio track or pause a currently playing track. Pressing another button or making a selection (e.g., a sound-effect selection) before pressing play/pause-button 15 may, in some embodiments, initiate playback of the audio track with a sound effect (e.g., stutter). The pause or resume that occurs when play/pause-button 15 is pressed may be nearly instantaneous. Pressing play/pause-button 15 may bring the audio track to a stopped or playing state by gradually decreasing the playback speed and pitch or gradually increase the playback speed and pitch, respectively. This is used to emulate the low angular deceleration and low angular acceleration found on some vinyl-record turntables. A control, such as stop-time knob 13, is used to increase or decrease the rate of gradual playback speed and pitch increase or decrease when play/pause-button 15 is pressed.

Media player 140 contains a cue-button 16. Pressing cue-button 16 during audio-track playback stops playback and places the virtual audio playhead to a previously set cue point. The virtual audio playhead is an abstraction indicating a location of an audio track that is currently playing or will be played if playback is activated. A cue point is set by, for example, pausing audio track playback, moving the virtual audio playhead to the desired cue location by rotating platter 11, and pressing cue-button 16.

Media player 140 has track-skip buttons 17 such as previous-track button 17a and next-track button 17b to select a previous or next track, respectively. If the virtual audio playhead is not at the beginning of a track, pressing previous-track button 17a moves the virtual audio playhead to the beginning of the track the virtual audio playhead is currently on.

Media player 140 has a sync-button 21, which, when pressed a first time, designates media player 140 as a master unit, which will dictate the playback tempo of connected units when synchronization is activated. Subsequently pressing a sync-button on another connected media player causes the other connected media player to adjust its playback tempo to match the playback tempo of media player 140. Synchronization is deactivated by, for example, pressing sync-button 21 while synchronization is active or by pressing another button and sync-button 21 simultaneously while synchronization is active. If media player 140 is not currently a master unit but is in synchronization with another media player that is a master, pressing master-button 22 will, in certain embodiments, make media player 140 the new master and the other media player not a master. For example, the other media player will become a slave or independent of media player 140 with respect to tempo control.

Figure 12:
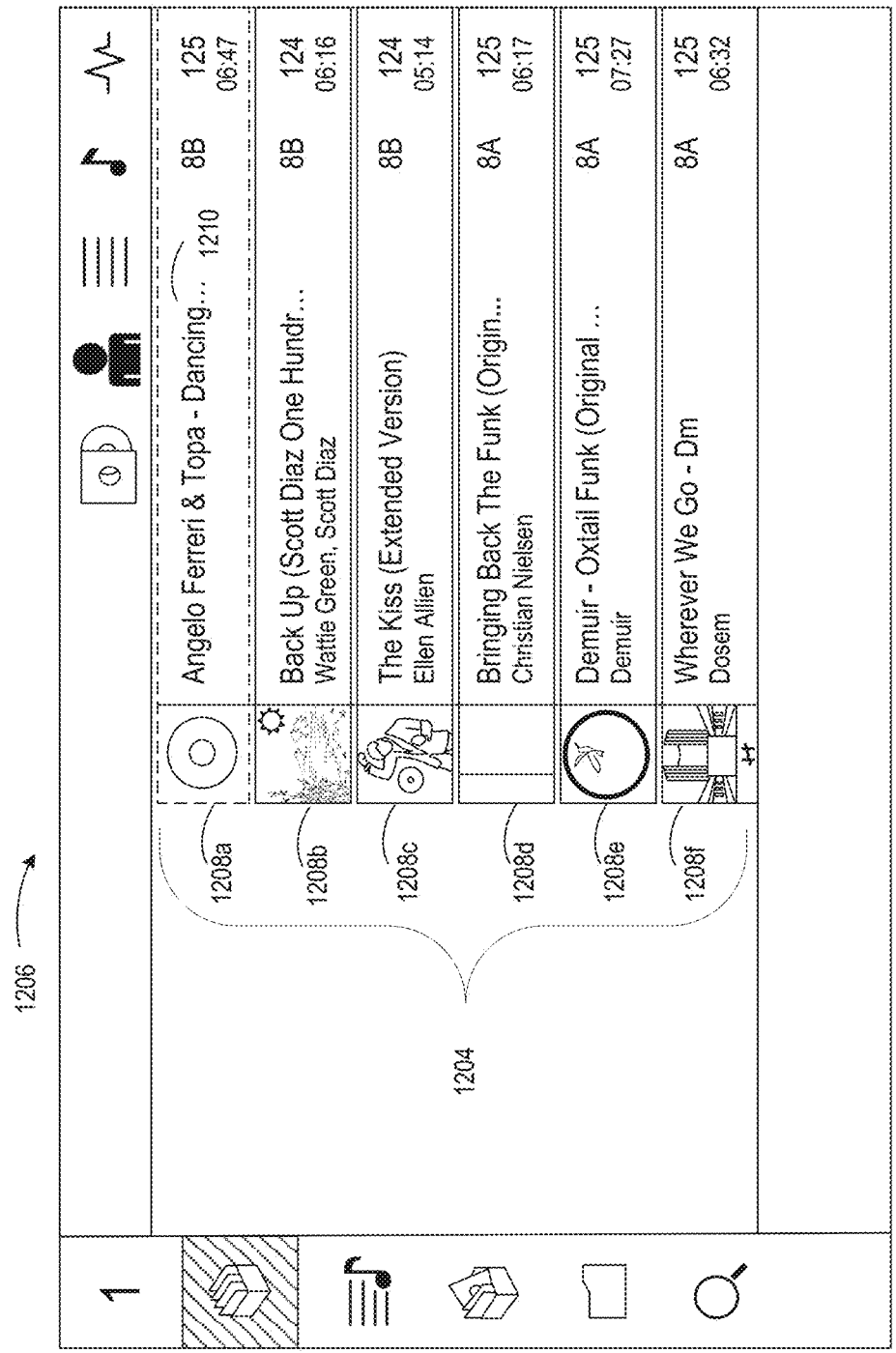
FIGS. 12-15 illustrate exemplary displays.
Figure 13:
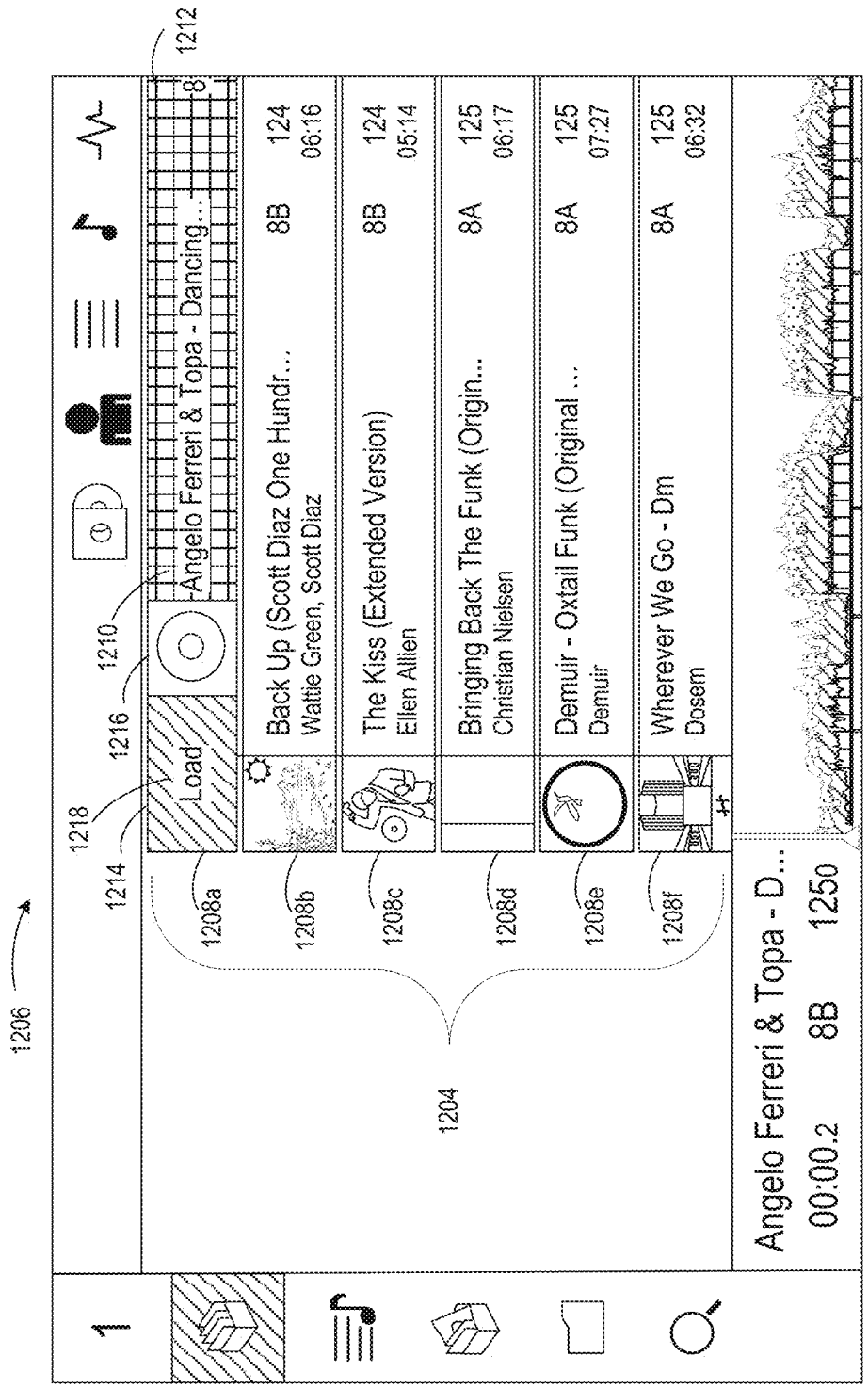
Figure 14:
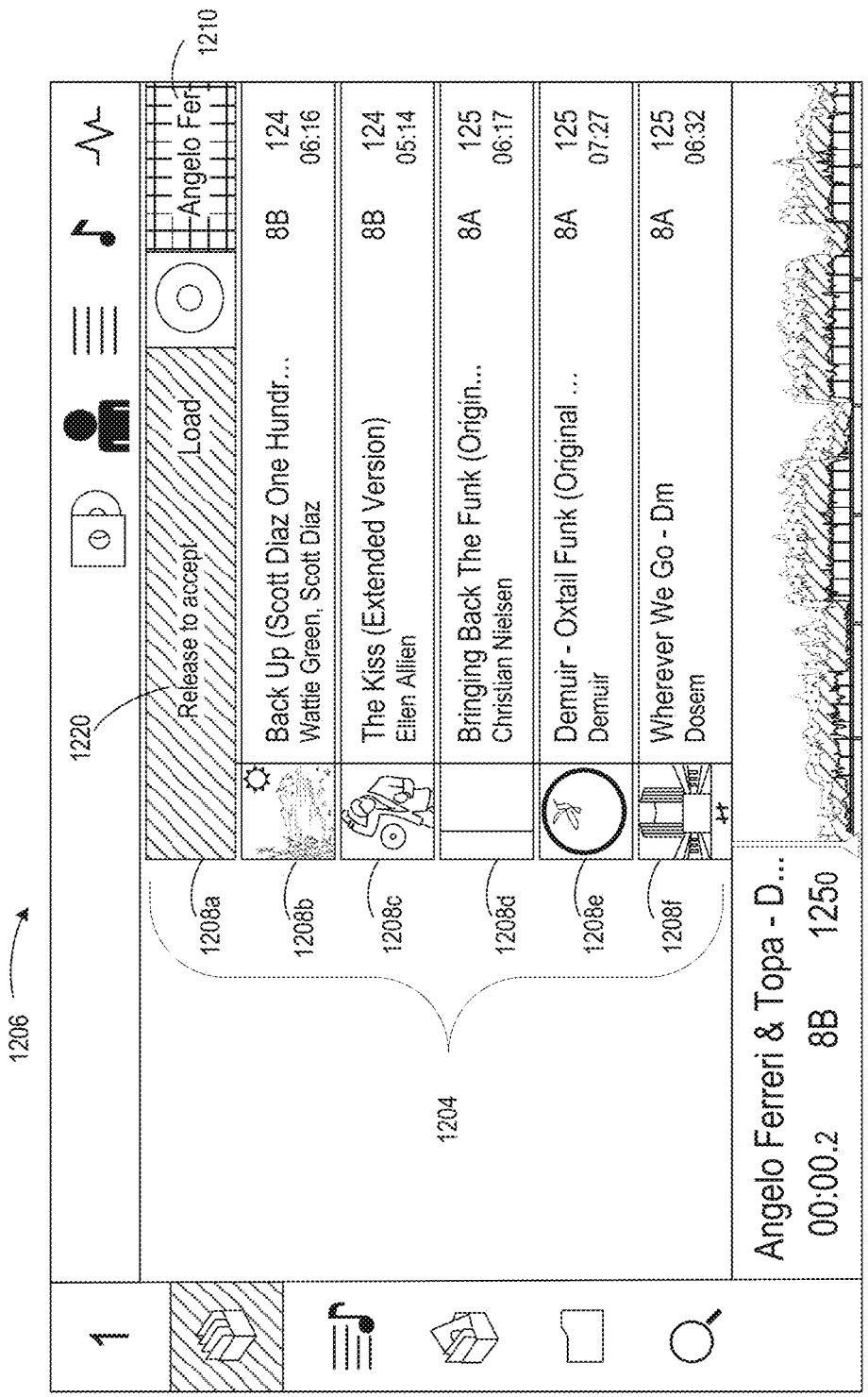

Display 1 may display a list of audio tracks in a user interface, such as audio-track list 1204 in user interface 1206 illustrated in FIG. 12. Audio-track list 1204 may comprises audio tracks 1208a-f. To select an audio track for a particular purpose, a gesture is performed on display 1. An audio track may be selected, for example, to be loaded to an audio deck and thereby queued for playback. An audio track may be selected to be added to another audio-track list. In an exemplary embodiment, to select audio track 1208a for loading to a deck, a contact is made with display 1 at the location where the title or other information about track 1208a is displayed and the point of contact moved to another location on display 1. The contact is continuous during the moving. If the point of contact was moved a sufficient length (e.g., a threshold length that is determined by, for example, the size of display 1), track 1208a is loaded to a deck. For example, if the point of contact was moved at least one inch, track 1208a is loaded to the deck. In some embodiments, track 1208a is loaded when the contact ends if the point of contact was moved a sufficient length. In some embodiments, both the length the point of contact is moved and the direction in which the contact is moved determine whether track 1208a is loaded to the deck. For example, track 1208a may be loaded if the point of contact is moved one inch to the right exclusively or in addition to any vertical movement and ended at least one inch to the right of where the contact began. As illustrated in FIGS. 12, 13, and 14, information associated with track 1208a (e.g., artist and title text 1210) is shifted based on the movement of the point of contact. For example, if the point of contact is moved to the right, the artist and title text 1210 are shifted to the right. In some embodiments, the background of the area occupied by the display of information associated with track 1208a is changed if contact is made with the portion of the display showing information associated with track 1208a and the point of contact moved. For example, if the point of contact is made within the area bounded by the dashed line 1208a of FIG. 12 and moved to the right, the background of a first section 1212 of FIG. 13 is a first color. A second section 1214 is displayed on the opposite side of album art 1216 from first section 1212. Second section 1214 has a background that is the first color or another color. Second section 1214 provides an indication, such as text, that continuing the movement of the point of contact in a direction in which it was previously moved will result in a particular selection. For example, if the point of contact is moved to the right, section 1214 will show text 1218 of FIG. 13, indicating that continuing the movement of the point of contact to the right will load the track to a deck. In some embodiments, if the movement occurs for more than a threshold length and, in some embodiments, in a particular direction, display 1 will indicate that ending the contact (e.g., lifting a finger from display 1) will result in a selection. For example, the indication can be text 1220 of FIG. 14.

Figure 21:
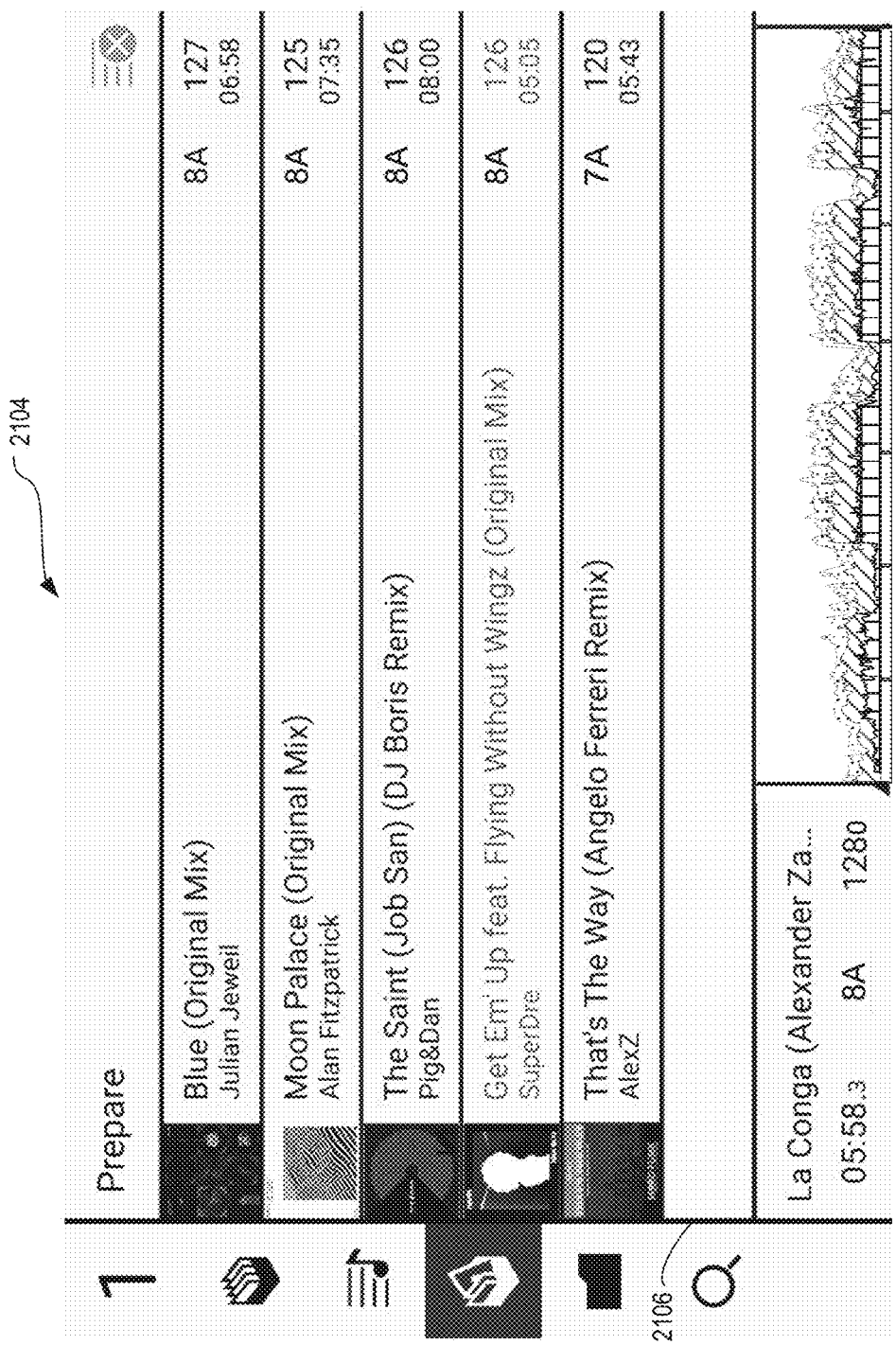
FIGS. 21-25 illustrate exemplary displays.
Figure 22:
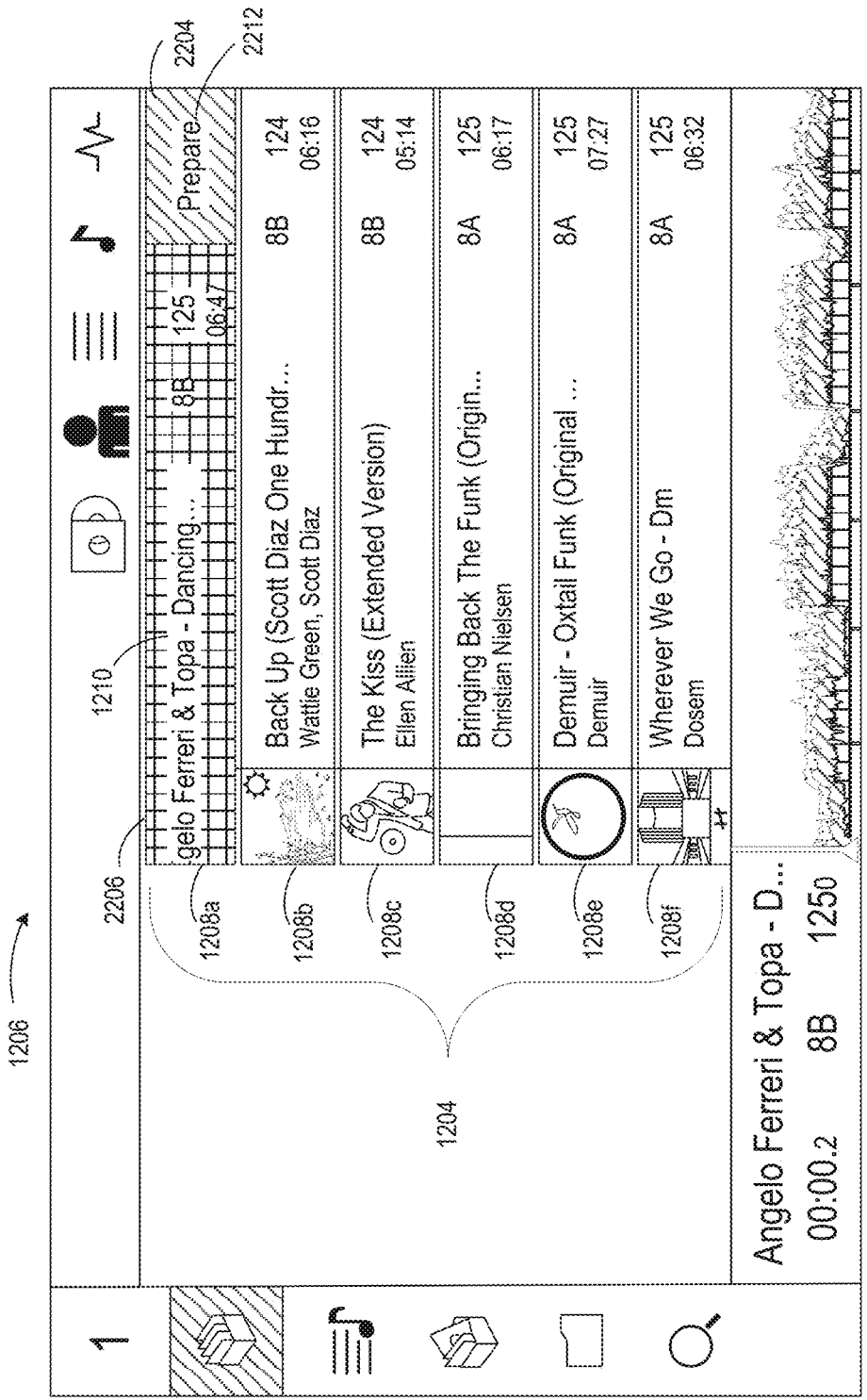
Figure 23:
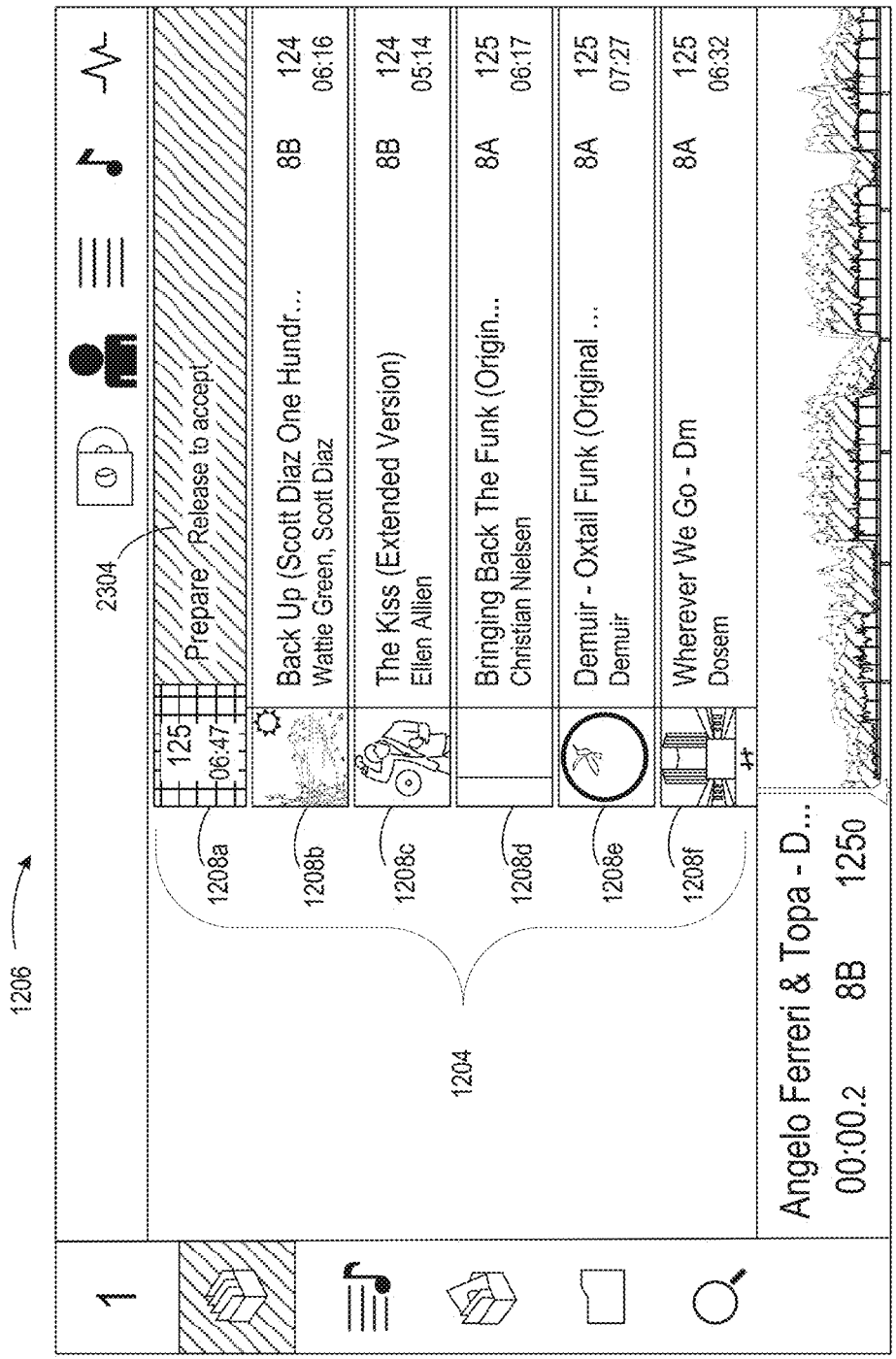
Figure 24:
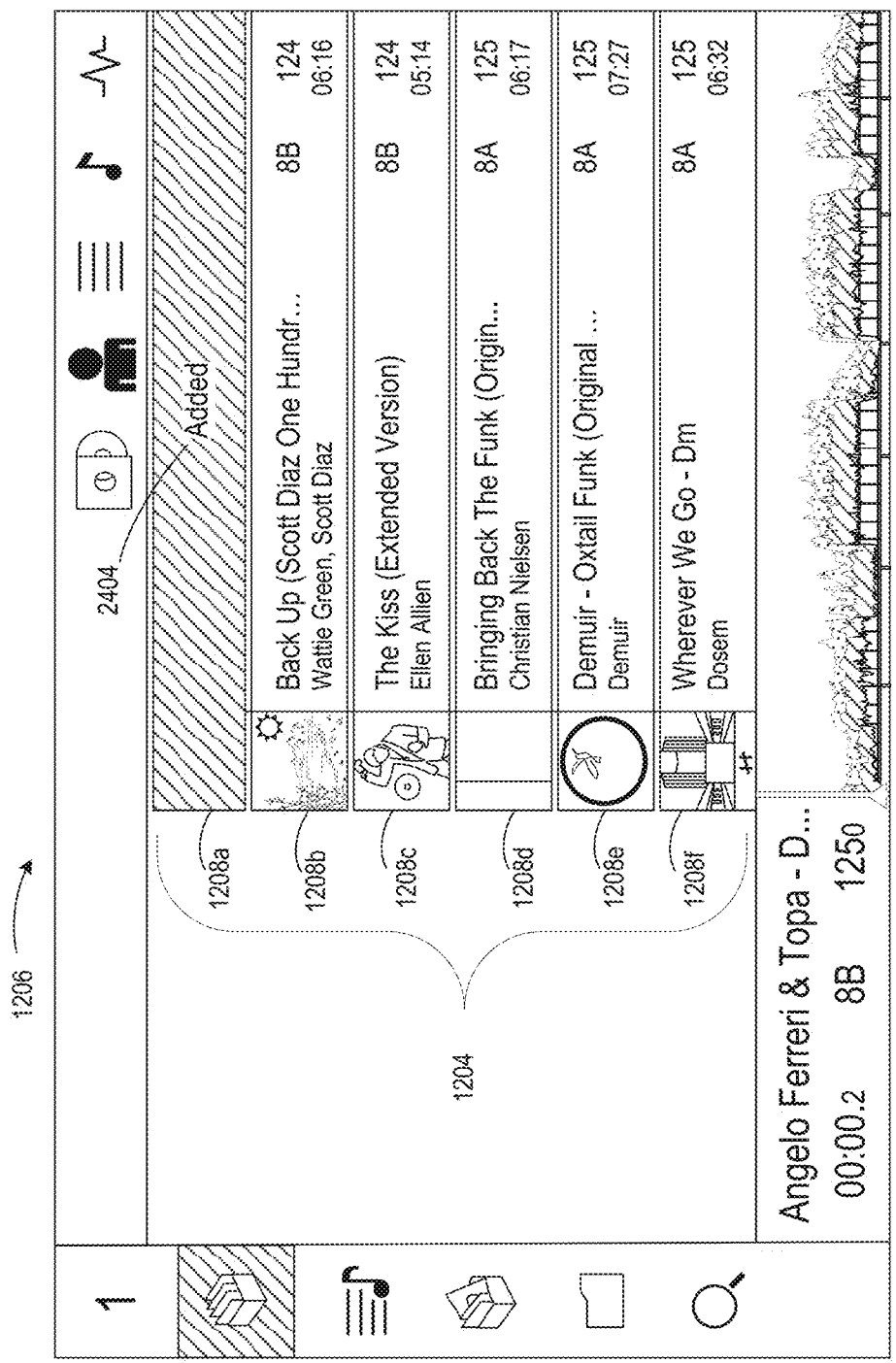
Figure 25:
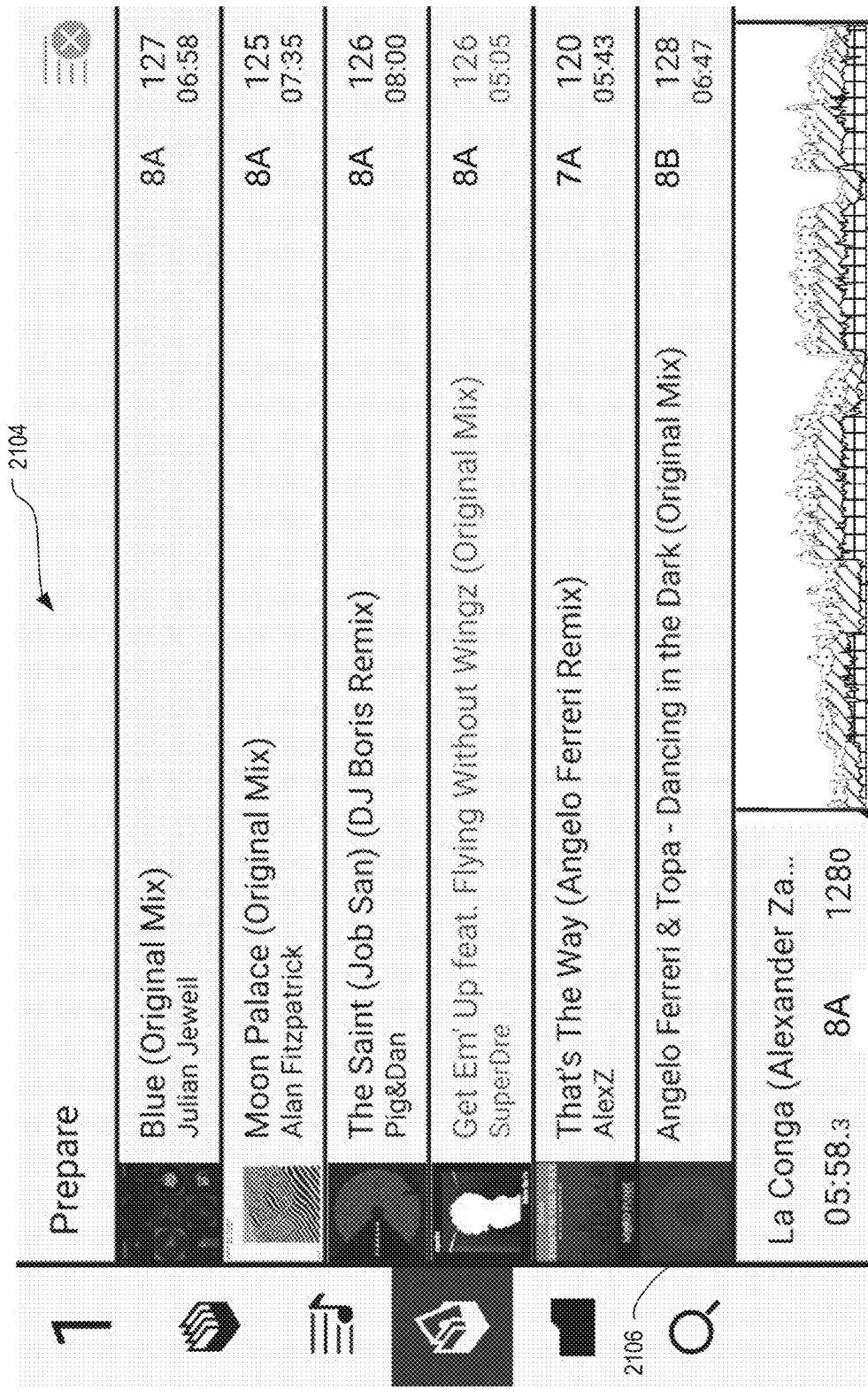

In some embodiments, the direction of the movement of the point of contact determines what type of a selection is made. For example, a movement to the right may loads a track to a deck, whereas a movement to the left adds a track on one track list to a different track list. For example, a "Prepare" or preparation track list 2104, to which track 1208a may be added, is illustrated in FIG. 21. To select audio track 1208a for adding to the track list 2104, a contact is made with display 1 at the location where the title or other information about track 1208a is displayed and the contact moved to another location on display 1. The contact is continuous during the moving. If the point of contact was moved a sufficient length (e.g., a threshold length), track 1208a is added to track list 2104. For example, if the point of contact was moved at least one inch, track 1208a is added to track list 2104. In some embodiments, track 1208a is added to track list 2104 when the contact ends if the point of contact was moved a sufficient length. In some embodiments, both the length the point of contact is moved and the direction in which the contact is moved determines whether track 1208a is added to track list 2104. For example, track 1208a may be added if the point of contact is moved one inch to the left exclusively or in addition to any vertical movement and ended at least one inch to the left of where the contact began. As illustrated in FIGS. 21, 22, and 23, information associated with track 1208a (e.g., artist and title text 1210) is shifted based on the movement of the point of contact. For example, if the point of contact is moved to the left, the artist and title text 1210 are shifted to the left. In some embodiments, the background of the area occupied by the display of information associated with track 1208a changes if contact is made with the portion of the display showing information associated with track 1208a and the point of contact moved. For example, if the point of contact is made within the area bounded by the dashed line 1208a of FIG. 12 and moved to the left, the background of a first section 2204 is a first color. A second section 2206 of FIG. 22 has a background that is the first color or another color. First section 2204 of FIG. 22 provides an indication, such as text, that continuing the movement of the point of contact in a direction in which it was previously moved will result in a particular selection. For example, if the point of contact is moved to the left, section 2204 shows text 2212 of FIG. 22, indicating that continuing the movement of the point of contact to the left will add track 1208a to the Prepare track list 2104. In some embodiments, if the movement occurs for more than a threshold length and, in some embodiments, in a particular direction, display 1 will indicate that ending the contact (e.g., lifting a finger from display 1) will result in a selection. For example, the indication may be text 2304 of FIG. 23. As illustrated in FIG. 24, text 2404 is displayed to indicate that track 1208a was added to track list 2104 if the requirements for adding track 1208a, discussed above, were met. Display 1 displays a similar indication if track 1208a is loaded to a deck, as described with respect to FIGS. 12-14. Once track 1208a is added to track list 2104, the track is displayed in the list, such as at track slot 2106 of FIGS. 21 and 25. In some embodiments, tracks in track list 2104 are removed from track list 2104 when they are loaded to a deck.

Display 1 displays color waveforms of audio tracks, such as audio tracks being played by media player 140. The audio track comprises audio-file data (e.g., audio signal data). The audio-file data comprises a plurality of values representing sound pressure level amplitudes at different frequencies at different times. Such values are referred to as samples. The waveforms of the audio tracks may be scrolled from a right side of display 1 to a left side of display 1 when the audio track is played in a forward direction, and scrolled in the opposite direction when the audio track is played in a backward direction. The waveforms are graphical visualizations of the changes in sound pressure level amplitude over time at different frequencies that correspond to the audio track.

Figure 11:
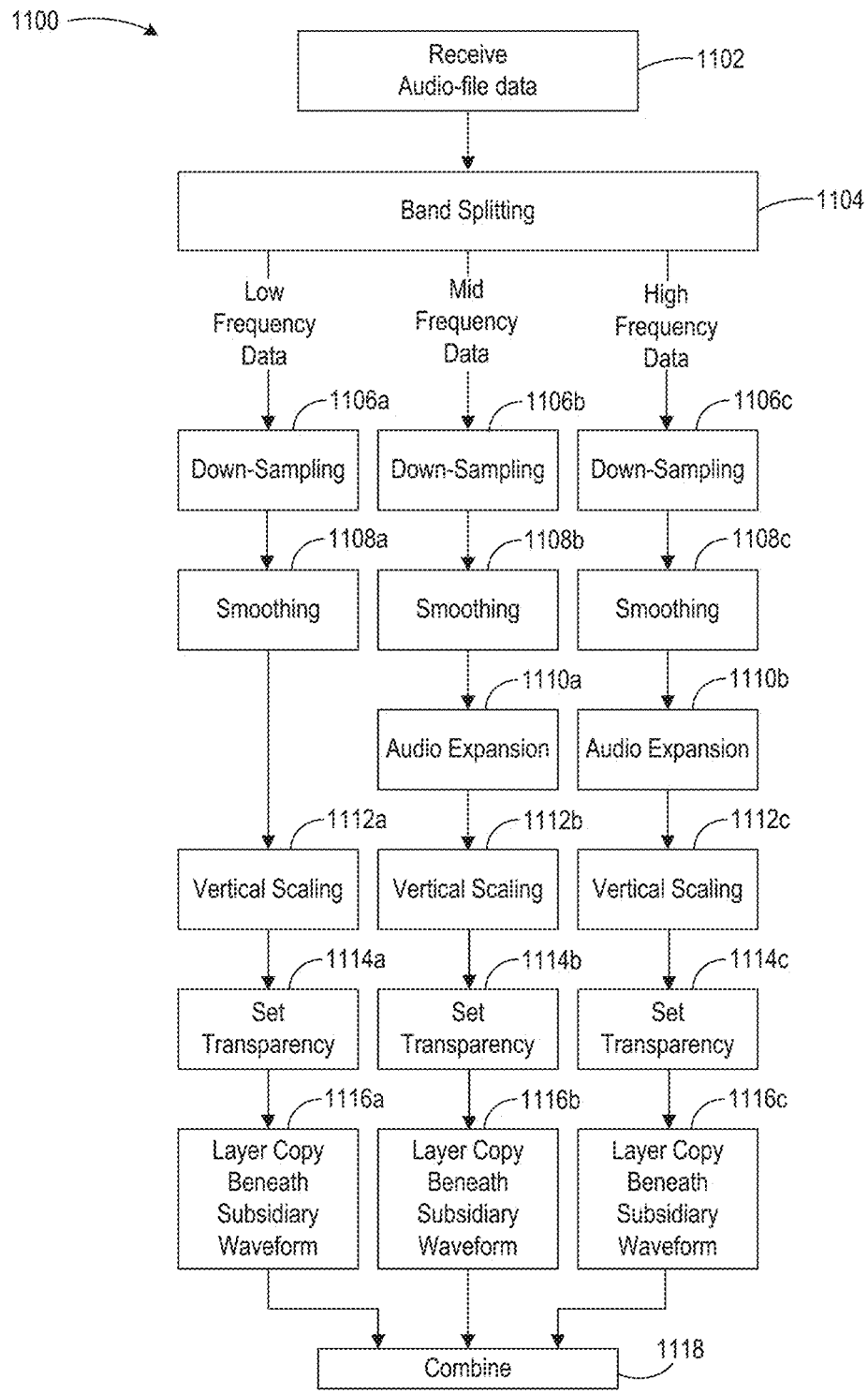
FIG. 11 illustrates an exemplary process for implementing certain embodiments of a waveform generation process.

Exemplary process 1100, illustrated in FIG. 11 and consistent with the present disclosure, is followed to implement certain embodiments of a waveform-generation process. The waveform generation process comprises receiving an audio track by a component of media player 140 (step 1102).

Figure 4A:
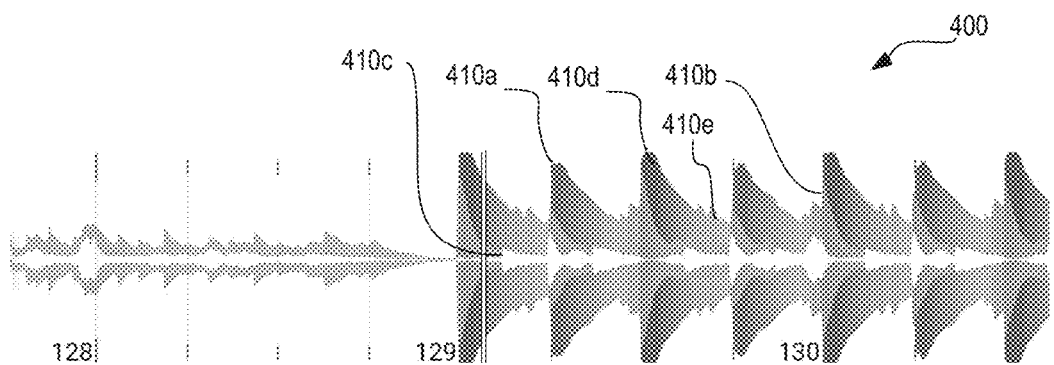
FIG. 4A illustrates an exemplary composite waveform.
Figure 4B:
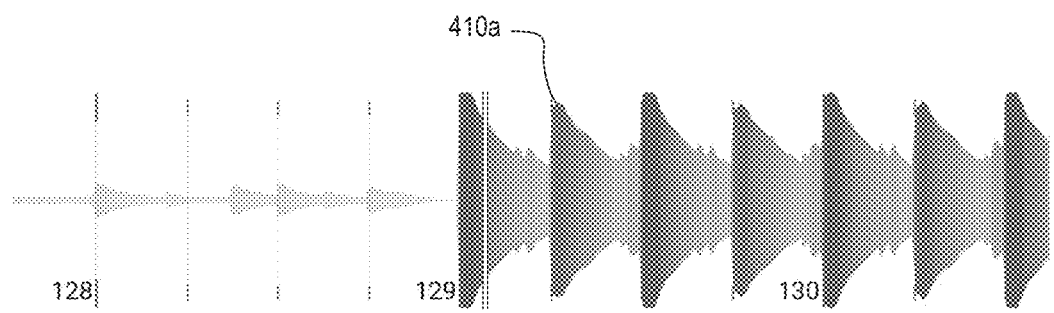
FIGS. 4B-4D illustrate exemplary subsidiary waveforms.
Figure 4C:
Figure 4D:
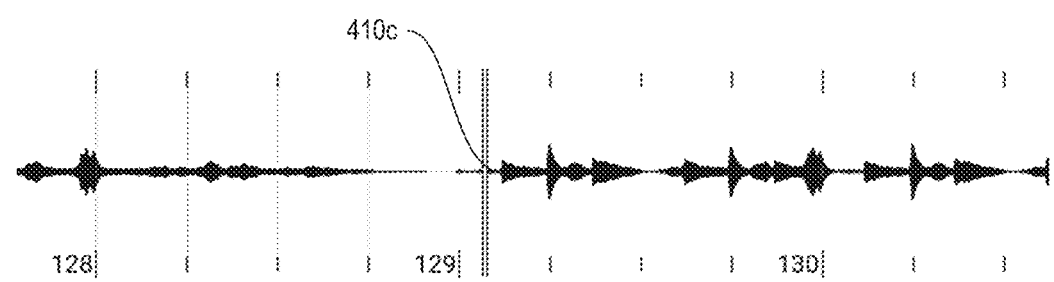

In certain embodiments, the audio track is split into two or more audio frequency bands (i.e., "band split"). A separate waveform is generated from audio data in some or all audio frequency bands (step 1104). These separate waveforms are referred to as "subsidiary waveforms." The subsidiary waveforms may be combined into a single graph that is referred to as a "composite waveform." The waveform displayed for an audio track on display 1 may be a composite color waveform, such as exemplary composite waveform 400 illustrated in FIG. 4A. Composite waveform 400 is a composite visualization of a plurality of superimposed subsidiary color waveforms, such as subsidiary waveforms 410a, 410b, and 410c. Subsidiary waveforms 410a, 410b, and 410c are illustrated individually in FIGS. 4B, 4C, and 4D, respectively. Subsidiary waveforms 410a, 410b, and 410c are constructed from the audio track in whatever manner provides greatest utility to the user. For example, a subsidiary waveform may correspond to a portion of the audio track in the frequency domain after the audio track has been processed by a bandpass filter. Different frequency bands can be used in one or more bandpass filters when generating different subsidiary waveforms. For example, subsidiary waveform 410a may be constructed by passing the audio track through a high-frequency bandpass filter (e.g., 5 kHz-20 kHz), subsidiary waveform 410b may be constructed by passing the audio track through a mid-frequency bandpass filter (e.g., 500 Hz-5 kHz), and subsidiary waveform 410c may be constructed by passing the audio track through a low-frequency bandpass filter (e.g., 20 Hz-500 Hz). In some embodiments, some of the filters used are high-pass and/or low-pass filters.

In certain embodiments, rather than graphing the amplitude of every audio sample with the vertical placement of a point at the horizontal position of each sample, the system graphs one amplitude point for a block of samples (e.g., 70 samples). This is referred to as downsampling (steps 1106a-c). The sample-block size may be fixed or varied in order to prevent detection of false sonic artifacts. The amplitude graphed for a sample block may be a root-mean-square amplitude for the sample block or may be computed using any other useful function (e.g., an averaging function). The horizontal placement of the point graphing the calculated amplitude for a sample-block may be anywhere within the region occupied by the sample-block. The points graphing the sample-block amplitudes may be connected to each other.

Figure 18A:
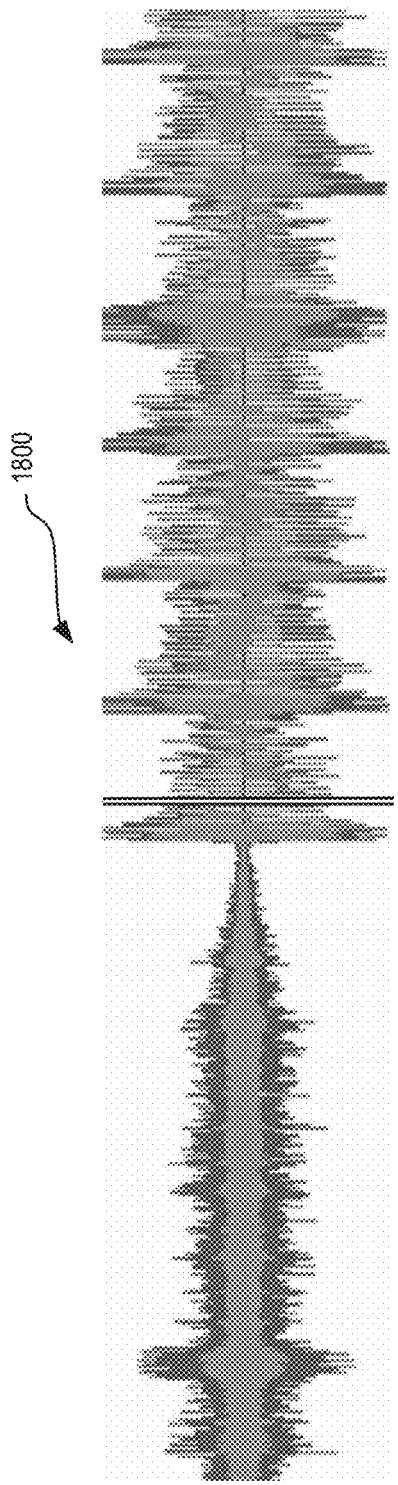
FIG. 18A illustrates another exemplary waveform.
Figure 18B:
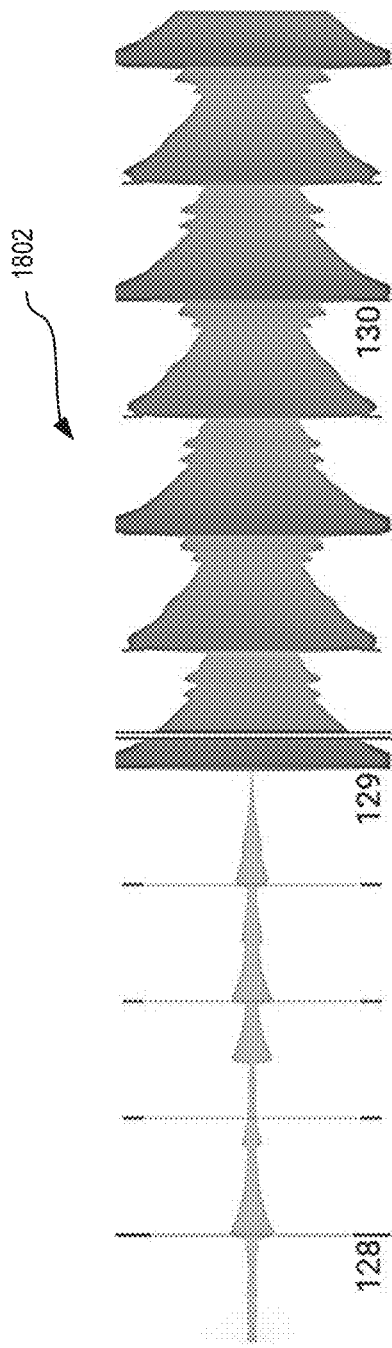
FIG. 18B illustrates another exemplary smoothed waveform.

The subsidiary waveforms have a "release factor" applied to them, whereby the subsidiary waveforms are prevented from having their amplitudes change faster than desired. This may be thought of as "smoothing" the subsidiary waveform such that only the envelope of the subsidiary waveform is visible (step 1108a-c). Doing so will assist a user in visualizing the envelope of the signal and thereby find and differentiate between different instrument parts by removing confusing or distracting high-transient information. The release factor may be achieved with a nonlinear low-pass filter, an envelope detector, and/or other means. For example, exemplary waveform 1800 illustrated in FIG. 18A may be smoothed to produce exemplary smoothed waveform 1802 illustrated in FIG. 18B. In certain embodiments, downsampling and smoothing is performed on the audio data before and/or after performing band splitting.

A subsidiary waveform is modified by mapping its audio data through a transformation function (e.g., an exponential function). This is accomplished by, for example, an audio enhancer or expander (step 1110a and 1110b). This will facilitate greater dynamics in the waveform because the high-amplitude sounds have the heights of corresponding graphical amplitude points raised more than graphical amplitude points corresponding to low-amplitude sounds. Doing so assists a user in identifying peaks in the audio signal.

Instead or in addition, a gain factor, such as a linear gain factor, may be applied to the subsidiary waveform. This is referred to as "vertical scaling" (step 1112a-c). The subsidiary waveforms may be enlarged vertically so they fill the entire display 1 and/or a substantial vertical portion thereof.

In some embodiments, different subsidiary waveforms are generated using different techniques for one or more of the different subsidiary waveforms (i.e., different processing paths are applied to different subsidiary waveforms). For example, as illustrated in FIG. 11, low-frequency subsidiary waveforms avoid mapping through a transformation function (e.g., "audio expansion") while mid- and high-frequency subsidiary waveforms are mapped. In some embodiments, some or all subsidiary waveforms are generated through identical or symmetrical signal-processing paths.

The subsidiary waveforms may have varying transparencies (step 1114a-c). The transparency level is set using any method that provides meaningful information to the user. For example, the transparency level of a portion or section of a subsidiary waveform (e.g., a sample block) is proportional or inversely proportional to the average amplitude of the subsidiary waveform at that portion (e.g., at a sample block).

In certain embodiments, each subsidiary waveform has a copy of the waveform superimposed onto it or layered beneath it in a different color and the transparency of only the subsidiary waveform or the copy adjusted at a portion of either waveform (e.g., at a sample block) proportionally to the amplitude at the portion (step 1116a-c). For example, one subsidiary waveform is created by a low-frequency bandpass filter and displayed in a navy blue color. A copy of this subsidiary waveform is displayed in an aqua blue color and layered beneath the navy blue subsidiary waveform. The transparency of the navy blue subsidiary waveform may be varied between low transparency (when the amplitude is high, such as portion 410d) and high transparency (when the amplitude is low, such as portion 410e). In this example, the low-frequency waveform display will appear aqua blue at sections with low amplitudes and navy blue at sections with high amplitudes. In certain embodiments, other methods of applying a color gradient are used. The transparency values are proportional or inversely proportional to the subsidiary waveform amplitude before or after any of the subsidiary-waveform processing steps described above. For example, the transparency value of a subsidiary waveform may be proportional or inversely proportional to the waveform's amplitude before or after smoothing. Visualizing changes in amplitude as a change of color in addition to a change in the vertical height of the subsidiary wave assists a user in locating, conceptualizing, and differentiate between different instrument parts within an audio track.

Figure 15:
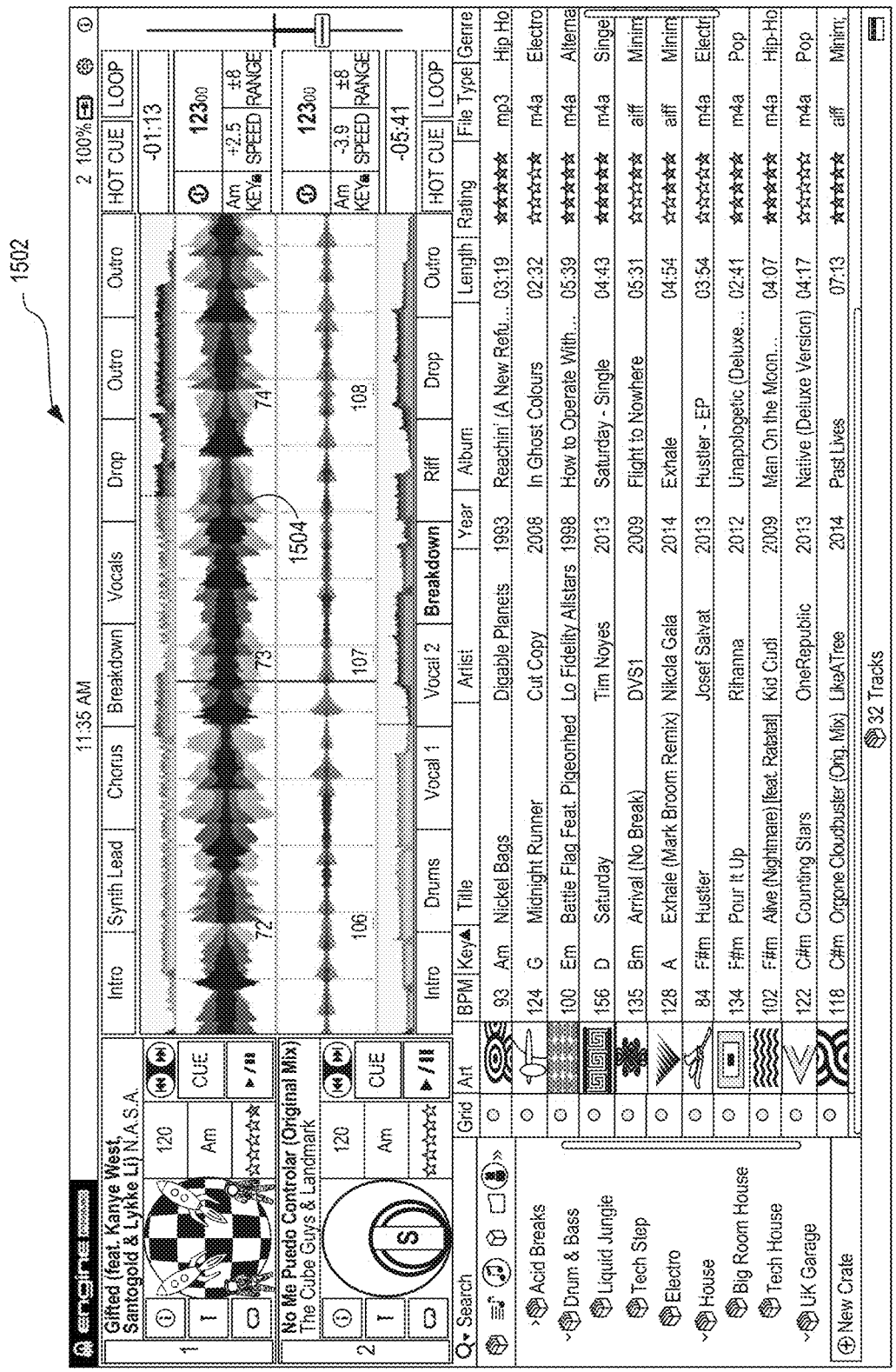

After generation of subsidiary waveforms or portions thereof is completed, the subsidiary waveforms or portions thereof are combined into a composite waveform (step 1118). The composite waveform is displayed to the user. The composite waveform may be displayed on DJ media player 140 and/or with software on a general-purpose computer. FIG. 15 illustrates an exemplary user interface 1502 in which composite waveform 1504 is displayed. User interface 1502 may be displayed on DJ media player 140 and/or with software on a general-purpose computer.

The foregoing method of creating waveform visualizations may be performed on DJ media player 140, on a general-purpose computer, or on another device.

DJ media player 140 may detect the musical tempo of one or more audio tracks. While numerous methods exist for detecting the tempo of an audio track, it is desirable to use a method that is accurate and fast. DJ media player 140 uses a fast and accurate method to determine the tempo of an audio track. A user may select an audio track based on its tempo. For example, a user may select an audio track for playback that has a similar tempo to an audio track that is currently playing. A user can use a visual indication of an audio track's tempo to know how much to adjust the track's tempo and whether to increase or decrease the playback speed (e.g., to match the audio track's tempo to another audio track).

The audio-track tempo is determined by detecting amplitude peaks in the audio track and analyzing the peak locations. Peaks may be detected in the original audio track or in one or more filtered tracks generated by passing the original audio track through one or more filters. For example, the original audio track may be run through one or more bandpass filters, each with a unique frequency band for filtering, and result in multiple filtered tracks (e.g., nine filtered tracks from nine bandpass filters). The filtering band or bands are of equal or different bandwidths and may, in some embodiments, be centered at fixed intervals on the audio-frequency spectrum or at randomized locations on the audio-frequency spectrum. For example, there may be nine bandpass filters and each filter's band's center frequency may be positioned one octave apart between 20 Hz and 20 kHz. The bandwidth of each filter's band may be set so that a particular frequency range is covered by all filter bands, or the bandwidth of each filter's band may be set so certain frequencies are not passed by any filter. The original track or the filtered tracks have a peak-detection algorithm applied on them to collect and store information about the amplitude peaks in the filtered tracks. In certain embodiments, the peak-detection occurs on a newly constructed waveform, which is created by taking the root-mean-square or other average amplitude of blocks of adjacent audio samples (e.g., the root-mean-square amplitude of every 70 samples or the root-mean-square amplitude of blocks of a varying sample-size). Such process is referred to as "downsampling." Newly constructed waveforms may be filtered as described above, or previously filtered waveforms may be used to construct new waveforms using sample blocks as described above.

Peak-detection may comprise analyzing a waveform for amplitudes that exceed a minimum amplitude value and/or are above a threshold set at a percentage of the amplitude of the last-identified peak. Instead of or in addition, other peak-detection methods may be used. The peak-detection information collected and stored for peaks is of at least one of one or more frequencies of sound energy most responsible for generating the peaks, the times within a track at which the peaks occur, the times between a given peak and the previous peak detected, the magnitudes of the peaks (e.g., sound pressure level), first estimated tempos based on the time between a given peak and the previous peak detected, or the durations of the peaks. The one or more frequencies of sound energy most responsible for generating the peak are determined with known methods, such as with a biquad filter or with Fast Fourier Transform analysis. The magnitude of a given peak may be an average value of the sound energy over a period of time or over a number of audio samples. In certain embodiments, the period of time or number of audio samples is randomized to decrease the chances of generating false sonic artifacts.

Figure 19A:
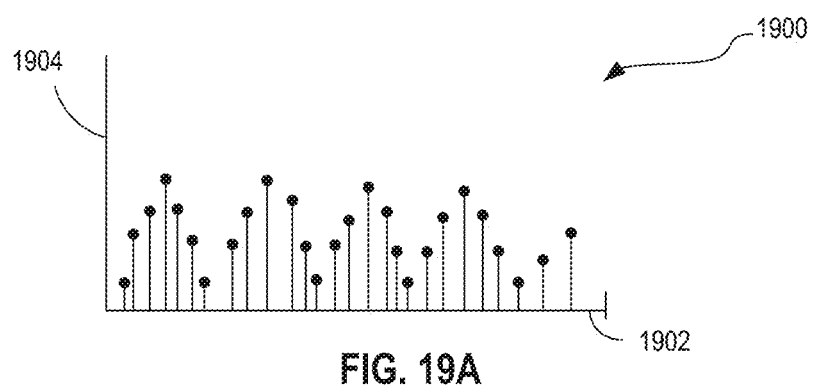
FIGS. 19A and 19B illustrate exemplary correlation graphs.

Collected peak information is analyzed for patterns and tempos can be estimated for one or more peaks. The estimated tempos for peaks with similar characteristics, such as peaks generated with sound energy at the same or substantially similar frequency and/or peaks with the same or substantially similar magnitude and/or duration, are analyzed to determine a first estimated tempo for the audio track by, for example, averaging the estimated tempos for the similar peaks and deriving the first estimated tempo by dividing a unit of time by the average distance between the similar peaks. For example, if the average distance between similar peaks is one second, dividing 60 seconds per minute by one second per beat gives 60 beats per minute. Peaks with different characteristics may be analyzed instead or in addition to determine the first estimated tempo. The first estimated tempo is used as an initial estimate for creating one or more tempo-and-peak-location correlation graphs ("correlation graphs" or "histograms") for other estimated tempos and associated measures of lengths determined by the estimated tempo (i.e., a measure associated with or based on a estimated tempo). Such a correlation graph 1900 is illustrated in FIG. 19A. Correlation graph 1900 may be visualized as a histogram where horizontal axis 1902 contains sample locations in a measure for an estimated tempo, numbering zero through the number of samples expected to be in the measure for the estimated tempo. The number of samples expected to be in the measure is mathematically determined by dividing the track sample-length by the estimated tempo and adjusting the quotient based on the number of beats in a measure and the time-unit used to express the tempo. The measures in the track may be assumed to be equal-length measures for a given estimated tempo. The system performing this analysis may assume that the track has a fixed number of beats in one or more measures or the system may allow the user to designate the number of beats in one or more measures of the track. The vertical axis 1904 of the correlation graph represents the quantity of measures in the track containing a peak at a particular sample location within the measure of a length determined by a tempo associated with the correlation graph. For example, if a track has twenty measures containing a peak at the fourth sample in each measure, the correlation graph will have a single point at the horizontal location of sample four and the vertical location of twenty. The location of a peak within a measure is referred to as the "distance" between the beginning of the measure containing the peak and the peak location within the measure. This distance is measured, for example, as a number of samples or by a unit of time. In certain embodiments, the horizontal axis, rather than having a separate location for each sample in a measure, instead has bins for a range of sample-locations within a measure (e.g., a first bin for samples 1-10, a second bin for samples 11-20, etc.).

Figure 19B:
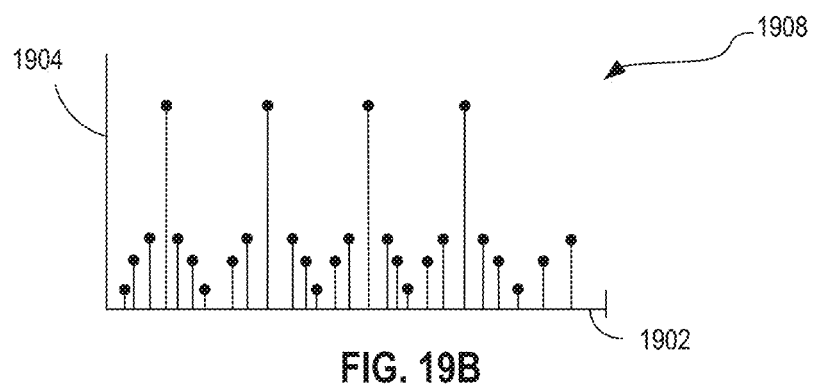

In some embodiments, a separate correlation graph is created for each estimated tempo. FIG. 19B illustrates an exemplary second correlation graph 1908 that can be compared to correlation graph 1900. Once the locations of peaks in measures have been accounted for in the histogram for a given estimated tempo, such as the first estimated tempo, a correlation graph is created for estimated tempos that are fixed or varied multiples of the initial estimated tempo (e.g., 2×, 0.75×, 1.5×). The correlation graphs are constructed for a range of estimated tempos, such as for two beats-per-minute below the first estimated tempo through two beats-per-minute above the first estimated tempo. The first estimated tempo may be incremented by a fixed amount (e.g., 0.01) or a varied amount to determine other estimated tempos. For estimated tempos in this range, fixed or varied multiples of the estimated tempos may have correlation tables constructed using the foregoing method.

Two or more of the histograms (e.g., correlation graphs) created for the estimated tempos are compared to determine which histogram is associated with the most accurate tempo of the track. For example, a score may be assigned to each estimated tempo's histogram. The score for the histogram may be an average of the highest three or other quantities of measures in the track containing a peak at a particular sample location within the measures for a given estimated tempo (i.e., the average of the three highest points on the histogram). For example, the histogram for an estimated tempo of 90 beats-per-minute may have three sample-locations within the track's measures where peaks occurred the greatest number of times (e.g., sample-location numbers three, seven, and eleven). In this example, if the peaks occurred 20, 25, and 26 times at sample-locations three, seven, and eleven, respectively, then the score assigned to the histogram for the estimated tempo of 90 beats-per-minute is the average of 20, 25, and 26, or 23.66. In certain embodiments, the numbers of peaks in the, for example, ten sample-locations with the most peaks are averaged to determine the score for an estimated tempo. Once a score is determined for the estimated tempos, the estimated tempo with the highest score is assigned as the track tempo. For example, the score of correlation graph 1908 may be higher than that of correlation graph 1900 because the average value of the peaks in correlation graph 1908 is higher than the average value of peaks in correlation graph 1900. The tempo used to create correlation graph 1908 may thus be considered more accurate than the tempo used to create correlation graph 1900. In certain embodiments, estimated tempos with outlying scores are disregarded (e.g., if a score is unusually high relative to other scores). In certain embodiments, the number of peaks at a particular sample-location is multiplied by the amplitudes (e.g., sound pressure levels) or the sum of the amplitudes of the peaks at that sample-location. The score may then be calculated using this product. In certain embodiments, the amplitudes of peaks may be incorporated into the scoring in another manner. In certain embodiments, tables for each estimated tempo score are created instead of or in addition to histograms. The tables may contain some or all of the information described in the histogram. In certain embodiments, only some of the detected peaks are analyzed, such as peaks generated by sound energy at a particular frequency. In certain embodiments, only some of the measures in an audio track are analyzed. In certain embodiments, the score for a histogram is determined in part by analyzing the frequency of the sound energy that contributed to peaks at the location having the greatest number of peaks. For example, if a number of peaks were generated by low-frequency sound energy at a location for a first estimated tempo and the same number of peaks were generated by high-frequency sound energy at a location for a second estimated tempo, the first estimated tempo may be designated as the accurate tempo because the peaks at the location for the first estimated tempo were generated by lower-frequency sound energy or sound energy with a frequency below a threshold frequency. The threshold frequency may be set by determining the frequency dominated by one or more instruments in the track that is played on many beats within the track and/or mostly on beats within the track.

The downbeat locations in a track may be determined by partitioning the histogram created for the estimated tempo with the highest score into a number of sections equal to the number of beats in the measures. In some embodiments, two or more sections have an equal number of samples. For example, a histogram for a 100-sample-long measure with four beats may be partitioned into four sections, each 25 samples long. The sample location having the greatest number of peaks is determined to be the downbeat. In certain embodiments, the number of sample locations compared is the number of beats in the measure associated with a histogram. For example, this may comprise determining the sample locations having the greatest number of peaks within sections and comparing the numbers of peaks at those locations in the different sections. In certain embodiments, the number of peaks at sample locations is multiplied by the amplitudes (e.g., sound pressure level) or the sum of the amplitudes associated with the peaks at sample locations and the products compared. In some embodiments, a weighting factor is applied such that peaks that are created with lower-frequency sound energy are compared more favorably to peaks created with higher-frequency sound energy. For example, if a sample location had peaks created with mostly low-frequency energy and another sample location had peaks created with mostly high-frequency energy, the former sample location is assigned as the downbeat even if the number of peaks at the former sample location is equal to or less than the number of peaks at the latter location.

Figure 20:
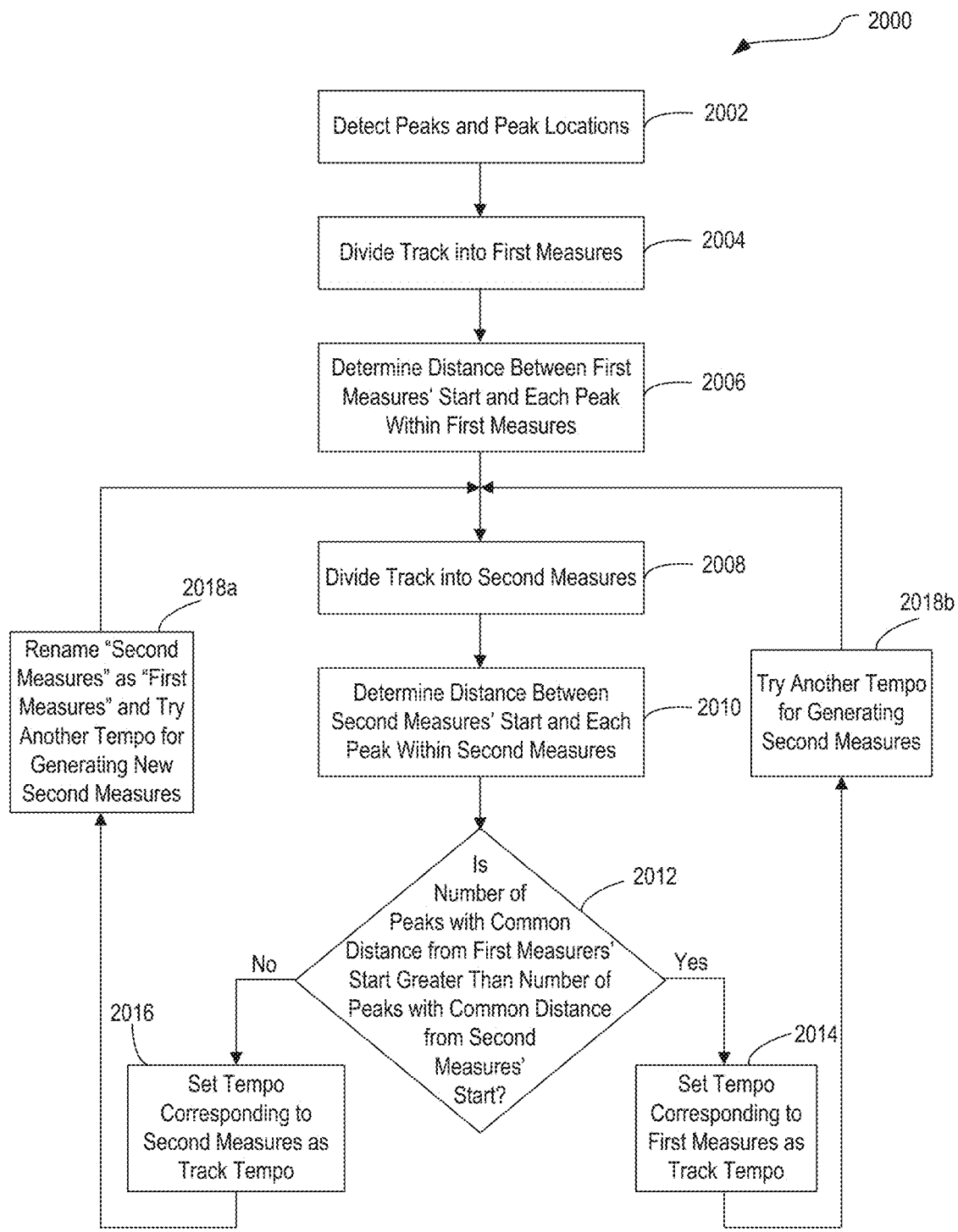
FIG. 20 illustrates an exemplary process for detecting tempo.

In certain embodiments, the foregoing methods may comprise an exemplary process 2000 for detecting tempo illustrated in FIG. 20. Process 2000 comprises detecting peaks and peak locations in a waveform of a digital audio track (step 2002). Process 2000 comprises dividing the track into first measures based on a first estimated tempo (step 2004). The first measures may have equal lengths. The first measures may contain detected peaks at peak locations. Process 2000 comprises determining the distances between the start of the first measures and the peak locations within the first measures (step 2006). Process 2000 comprises dividing the track into second measures based on a second estimated tempo (step 2008). The second estimated tempo may be determined based on the first estimated tempo (e.g., the second estimated tempo may be a multiple of the first estimated tempo). The second measures may contain detected peaks at peak locations. Process 2000 comprises determining the distances between the start of the second measures and the peak locations within the second measures (step 2010). Process 2000 comprises determining whether the number of peaks with a common distance from the first measures' beginnings is greater than the number of peaks with a common distance from the second measures' beginnings (step 2012). If so, the first estimated tempo is considered more accurate than the second estimated tempo. The tempo corresponding to the first estimated tempo may be set as the track tempo (step 2014). Otherwise, the tempo corresponding to the second estimated tempo is set as the track tempo (step 2016). In certain embodiments, another form of comparing the first estimated tempo to the second estimated tempo may be used. If another estimated tempo is compared to the set tempo for accuracy, the process will repeat for the set tempo and the new estimated tempo (steps 2018*a* and 2018*b*). Process 2000 may be repeated until a tempo is estimated with sufficient accuracy. It is to be understood that a measure length may be used to derive a corresponding tempo and vice versa.

The foregoing methods of tempo and downbeat detection may be performed on DJ media player 140, on a general-purpose computer, or on another device.

Media player 140 contains a platter 11 (e.g., a control wheel) or other controller mechanism for controlling a virtual audio playhead, as illustrated in FIG. 1. As discussed above, the virtual audio playhead is an abstraction indicating a location of an audio track that is currently playing or will be played if playback is activated. Platter 11 and/or other controls on media player 140 may be used to control audio playback or other features on other devices reading an audio file (e.g., an external general-purpose computer). Platter 11 is manually or automatically rotated clockwise or counter-clockwise, corresponding to a progression of the virtual audio playhead forward in an audio track or backward in the audio track, respectively. Platter 11 may comprise a side portion 11*b* and a top portion 11*c*. During manual rotation of top portion 11*c*, media player 140 may process the audio track being controlled to create a vinyl-scratching sound effect, emulating the sound that would be produced by moving a vinyl-record turntable needle back and forth across a vinyl record containing the audio track. Such operating mode of top portion 11*c* is selected by pressing vinyl-button 14 or pausing audio-track playback. When vinyl-button 14 is not pressed, top portion 11*c* may be rotated clockwise to temporarily increase playback speed or counter-clockwise to temporarily decrease playback speed during audio-track playback. Platter side-portion 11*b* may be rotated clockwise to temporarily increase playback speed or counter-clockwise to temporarily decrease playback speed.

Platter 11 is touch-sensitive. The touch-sensitivity may be accomplished by, for example, using a capacitive sensing surface for platter 11. If platter 11 is touch-sensitive, an audio track controlled by platter 11 may be stopped by resting one's hand on platter 11 and then resumed by lifting one's hand from platter 11.

Figure 7A:
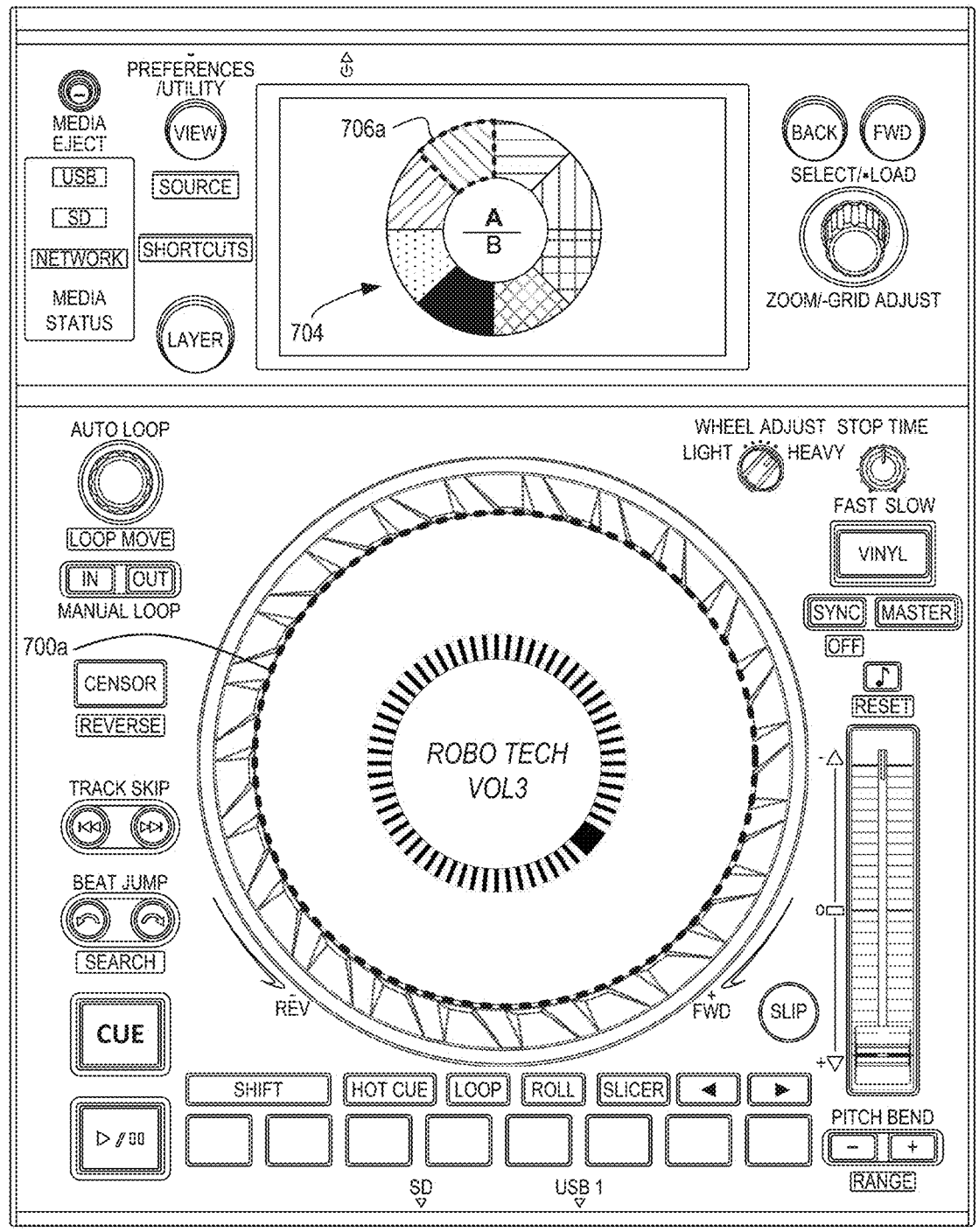
FIG. 7A illustrates another view of an exemplary media player.
Figure 7B:
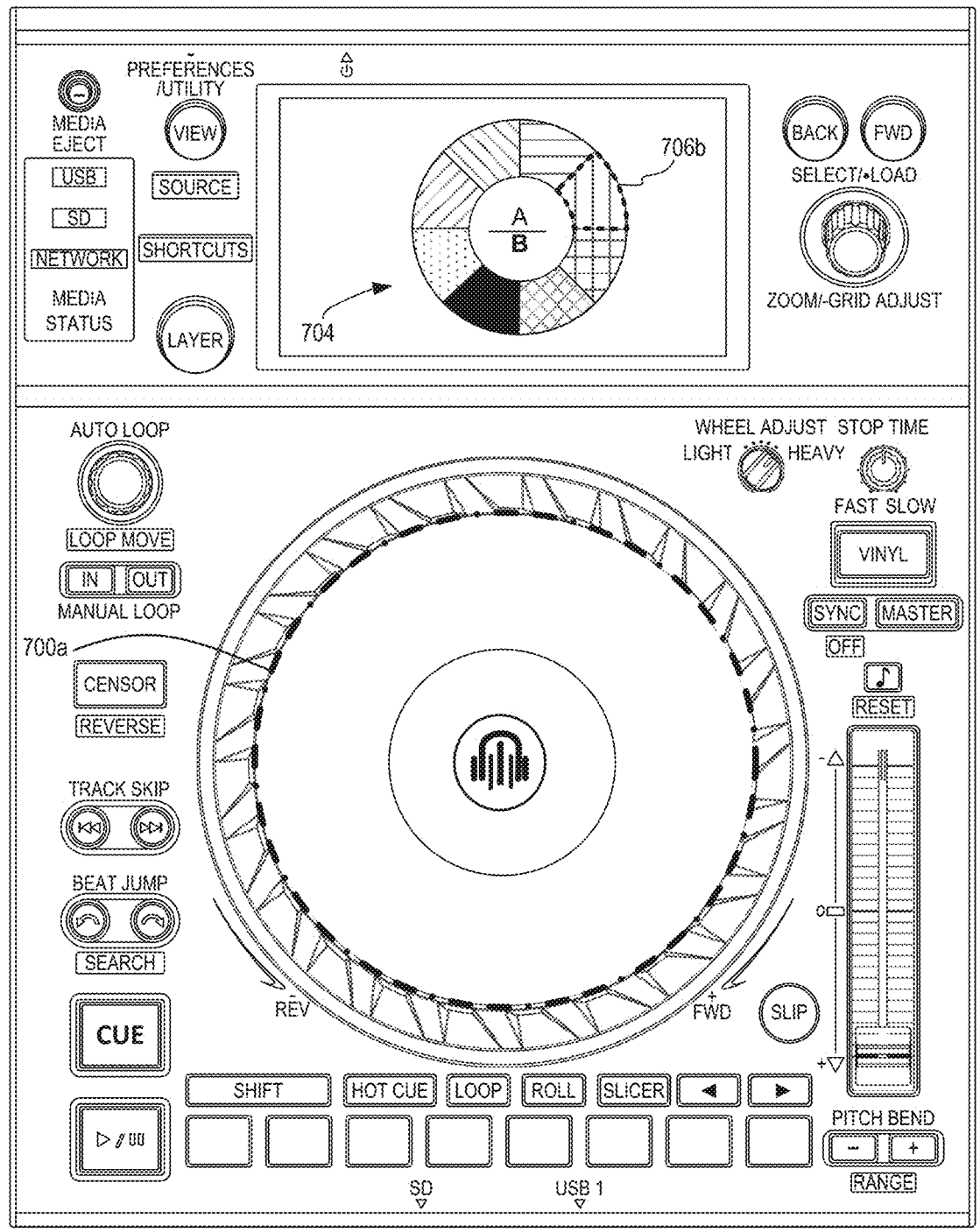
FIG. 7B illustrates another view of an exemplary media player.

Platter 11 has one or more light-emitting elements associated with it, such as a platter light-emitting diode ("platter-LED 700*a*") of FIG. 7A. The light-emitting elements are within platter's 11 housing, Media player 140 may have other light-emitting elements or features (e.g., buttons). One or more of the light-emitting elements on media player 140, such as platter-LED 700*a*, may be configured to emit light of a particular color. This may be done to associate media player 140 or controls of media player 140 with a particular color selected from a plurality of selectable colors. Similarly, the one or more light-emitting elements may be configured to emit a color that depends on which layer of media player 140 the media player 140 currently controls. For example, a user may assign the color blue to be emitted by platter-LED 700*a* when media player 140 is set to control an audio track playing on layer A and assign the color orange to be emitted by platter-LED 700*a* when media player 140 is set to control an audio track playing on layer B (as illustrated in FIG. 7B), in certain embodiments, the platter color is selected on display 1. As illustrated in FIGS. 7A and 7B, color wheel 704 may be displayed on display 1. Display 1 shows the selected platter-LED 700*a* color, such as colors 706*a* and 706*b*, with a bolded or highlighted outline. For illustrative purposes, these outlines in FIGS. 7A and 7B are shown with a dashed line and a dot-dashed line, respectively, to indicate different colors on color wheel 704 and platter-LED 700*a*. It is to be understood, however, that the outlining or bolding may be done with other types of lines, such as solid lines. It is to be understood that platter-LED 700*a* may comprise multiple LEDs.

Figure 2:
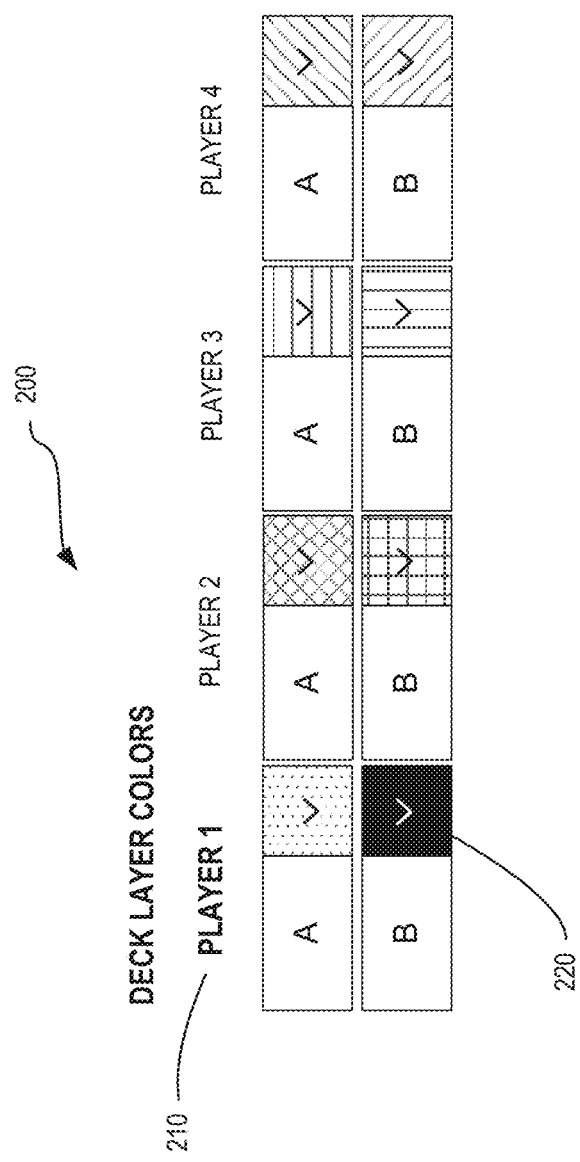
FIG. 2 illustrates an exemplary display.
Figure 3B:
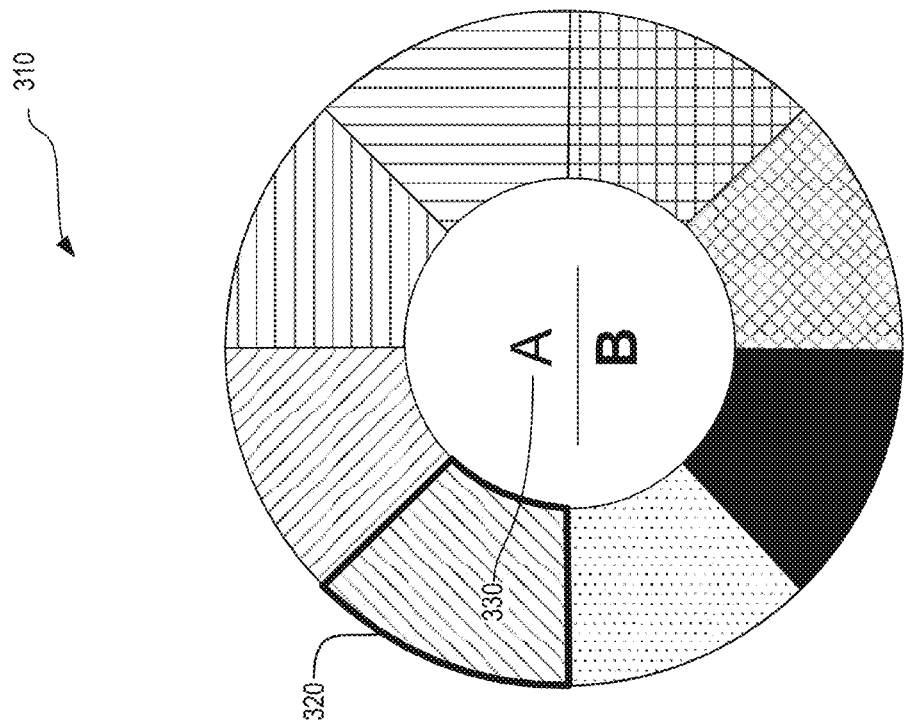
FIG. 3B illustrates another exemplary display.
Figure 3A:
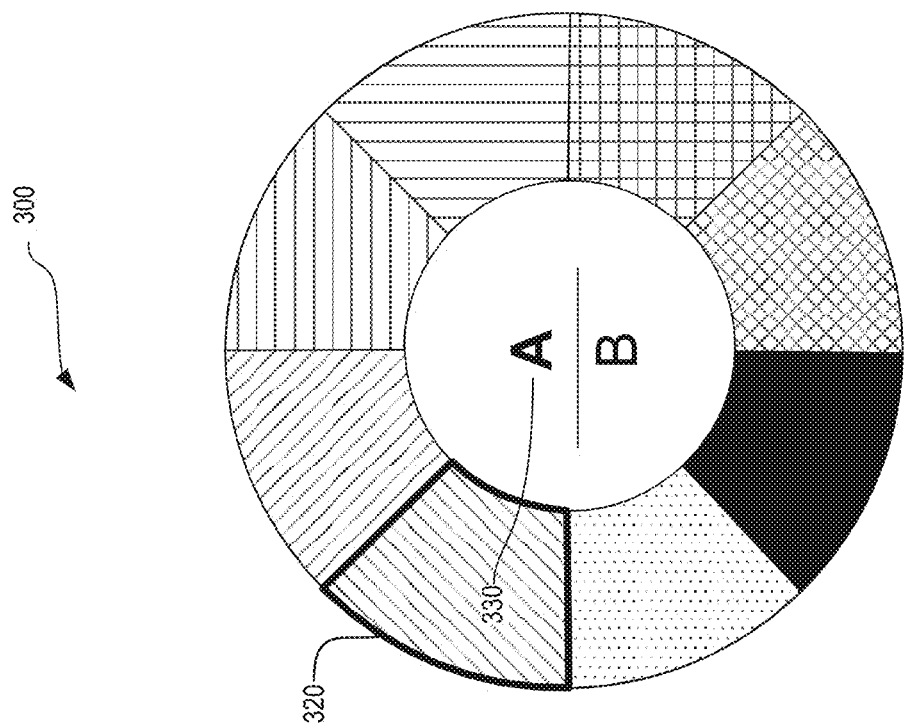
FIG. 3A illustrates another exemplary display.

Display 1 on media player 140 is used to assign colors to light-emitting elements of other media players that are connected to media player 140 and/or to one or more layers on those other connected media players. In an embodiment, a user is presented with all available media players and the layers thereon, as illustrated in exemplary display 200 of FIG. 2. When the user selects a media player or a layer, such as player 210 ("PLAYER 1") or layer 220 ("B") on player 210, the user is presented with a color-selection display, as illustrated in exemplary display 300 of FIG. 3A. Display 300 is a color wheel. The user may select color 320 to assign it to the selected player or layer. If the user wants to select the color for another layer on the selected player, the user selects the layer 330 and select color 320 on exemplary display 310 of FIG. 3B. Exemplary display 310 of FIG. 3B indicates which layer is being associated with the selected color by highlighting or bolding layer 330. Exemplary display 310 outlines selected color 320 in bold to indicate that color 320 was selected. In certain embodiments, light-emitting elements can have colors assigned to them using software on a general-purpose computer. For example, a user may select one or more colors for or more light-emitting elements on a general-purpose computer and save these settings to a user profile. The user profile may then be loaded on media player 140 via a USB connection, a portable storage medium (e.g., an SD card), or another method. In some embodiments, the user profile may be associated with one or more audio files and loaded onto media player 140 when the user loads the one or more audio files.

Associating one or more colors with one or more players and/or layers thereon may provide a convenient indication of which layer is currently active on a particular media player and/or help a user differentiate between multiple media players during, for example, a high-energy performance with poor lighting conditions. One or more buttons and/or other controls may be light-emitting elements to which colors may be assigned.

In certain embodiments, information about the colors assigned to media players and/or layers is sent to a mixer or other control unit connected to the media players. This allows light-emitting elements located on the mixer or other control unit and associated with a particular media player and/or layer to be assigned the color assigned to the associated media player and/or layer.

Figure 6A:
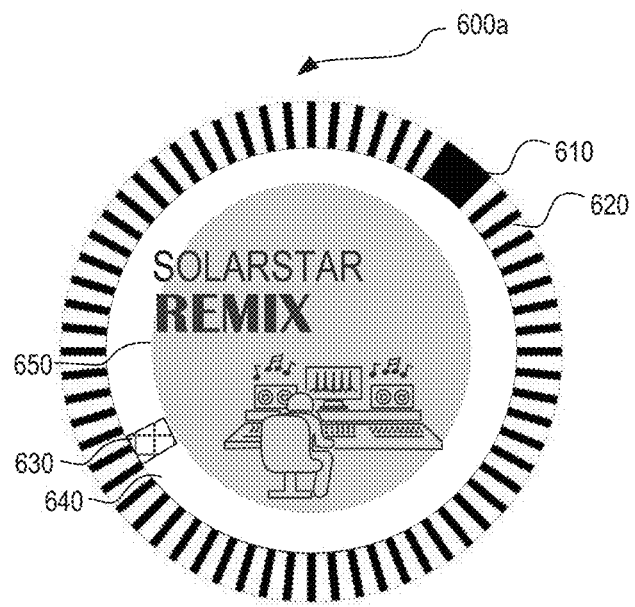
FIG. 6A illustrates an exemplary album-art display.

Platter 11 has a platter-display 11*a* positioned in its center. In some embodiments, platter-display 11*a* is positioned elsewhere on media player 140. Platter-display 11*a* shows a graphical display. The graphical display is customizable. For example, platter-display 11*a* may show information about a currently selected or playing audio file (e.g., file name, song name, artist name, album name, tempo, key signature, album artwork, and/or artist image). Platter-display 11*a* may show a custom image (e.g., a logo or trademark of the disk jockey using media player 140). Platter-display 11*a* may display information regarding audio track manipulation or other audio-track control information (e.g., the length of a created audio loop, the percent by which the track length is being increased, current virtual audio playhead position, current layer controlled by platter 11 or media player 140 in general, and/or the number of semitones by which the track is being pitch-bent). Platter-display 11*a* is generally used to visualize any information that would assist a user interfacing with media player 140. The information or graphic displayed may be static during a certain period of time or event (e.g., unchanging during audio-track playback), or it may be dynamic (e.g., a video or information that changes when it is determined to no longer be accurate). Platter-display 11*a* may show, for example, exemplary album-art display 600*a*, as illustrated in FIG. 6A. Platter-display 11*a* may display a highlight 610 on outer perimeter 620 of platter-display 11*a* or another portion of platter-display 11*a* to indicate the virtual audio playhead's position within a song. Highlight 610 may revolve around outer perimeter 620 at 33 and ⅓ revolutions per minute (RPM), 45 RPM, 78 RPM, or some other rate. In some embodiments, highlight 610 may revolve clockwise or counter-clockwise along the platter-display's 11*a* outer perimeter 620 or another portion of platter-display 11*a* to indicate what portion of an audio track has been played and/or what portion remains to be played (e.g., making a single full circle during playback of an audio track, such by beginning and ending at the 12 o'clock position). In some embodiments, instead or in addition to highlight 610 revolving around outer perimeter 620, highlight 630 may revolve clockwise or counter-clockwise along platter-display's 11*a* inner circle 640 between a logo 650 and outer perimeter 620. Highlight 630 may indicate the position of the virtual audio playhead when slip mode is activated (discussed below with respect to FIGS. 9A and 9B). When slip mode is activated, highlight 630 may be lined up with highlight 610. As a user rotates platter top portion 11*c* while in slip mode, highlight 630 may revolve in a manner that indicates the position of the virtual audio playhead within in the audio track. During this time, highlight 610 may proceed to revolve as it would if slip mode was not activated and platter top portion 11*c* not rotated.

Figure 6B:
FIG. 6B illustrates an exemplary loop-length selection display.
Figure 6C:
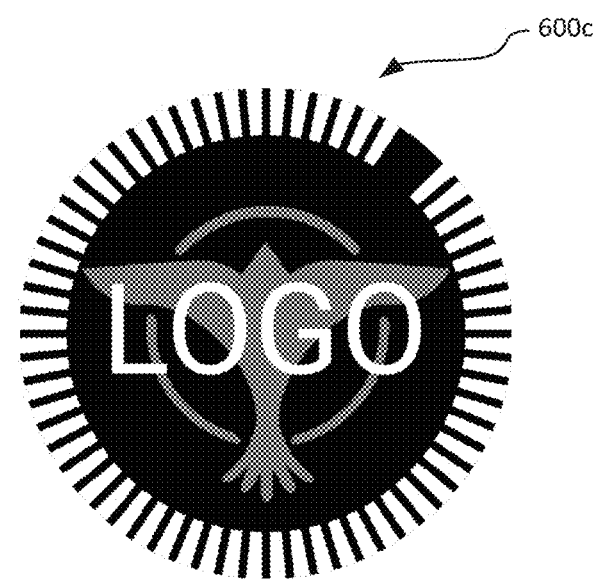
FIG. 6C illustrates an exemplary custom-logo display.

Platter-display 11*a* may show, for example, exemplary loop-length selection display 600*b*, as illustrated in FIG. 6B. Loop-length selection display 600*b* indicates the length of a currently playing loop or a selected loop (e.g., that the loop length is one 32nd of a beat). Platter-display 11*a* may show, for example, an exemplary custom-logo display 600*c*, wherein the custom logo displayed is specified and/or provided by the user, as illustrated in FIG. 6C. A display substantially similar to platter-display 11*a* can be in or about the center of a control wheel on a controller, such as a disk jockey controller used to interface with computer software or another media device.

Media player 140 has a speed-fader 18. Moving speed-fader 18 in one direction increases the playback speed and moving speed-fader 18 in the other direction decreases the playback speed. Increasing or decreasing the playback speed corresponds to compressing or expanding the playback time for an audio track and vice versa. If Key-lock button 20 is not pressed before moving speed-fader 18, increasing or decreasing playback speed may increase or decrease playback pitch, respectively.

Figure 8A:
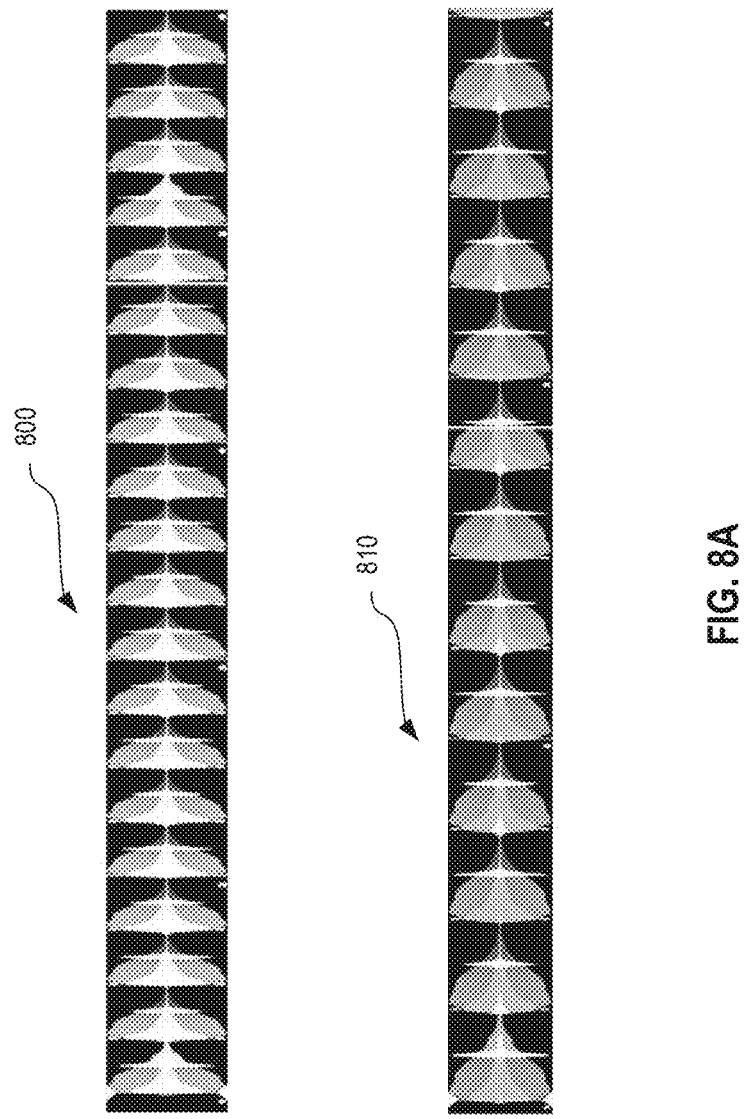
FIG. 8A illustrates an exemplary waveform.
Figure 8C:
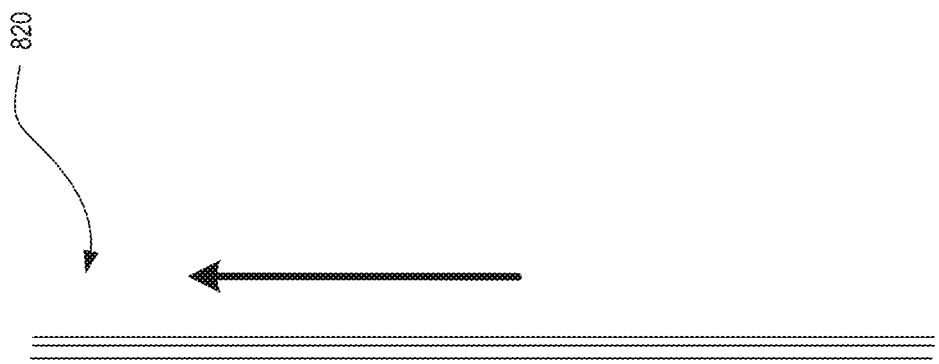
FIG. 8C illustrates another view of an exemplary potentiometer.
Figure 8B:
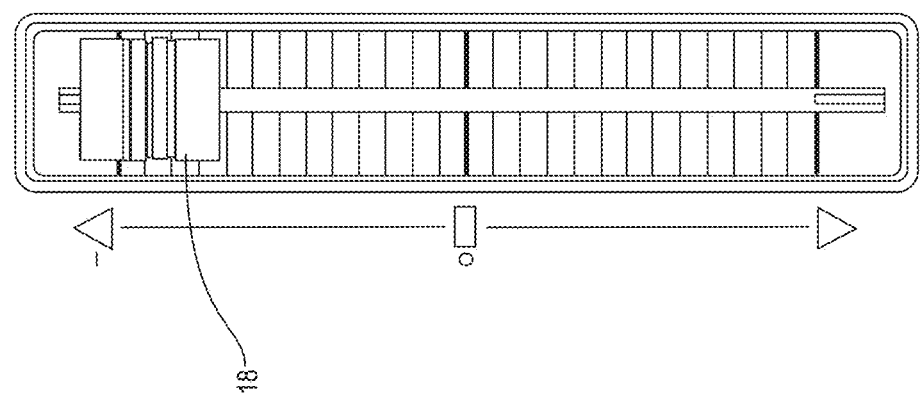
FIG. 8B illustrates an exemplary potentiometer.

Adjusting the speed of audio-track playback, such as by moving speed-fader 18 or other controller mechanism, alters the audio-track waveform displayed on display 1. For example, decreasing the speed of playback stretches out the waveform horizontally and/or increasing the speed of playback contracts the waveform horizontally. Exemplary waveform 800, as illustrated in FIG. 8A, is a waveform before the speed of playback is adjusted. In this instance, a fader such as fader 18 of slide potentiometer illustrated as element 820 in FIGS. 8B and 8C is set to a nominal setting (e.g., in the center), as illustrated in FIG. 8B. Decreasing the playback speed, such as by sliding fader 18 up in the slide potentiometer 820 as illustrated in FIG. 8C, causes the system to stretch or expand the waveform 800, resulting in an expanded waveform 810. The contracting or stretching may occur in one or more directions. Adjusting the waveforms in such manner serves as a visual indicator to a user that the track will take less or more time to play than before the speed change because there is less or more waveform, respectively, to scroll through. Waveform 800 may be contracted or stretched by an amount that is proportional to the playback speed increase or decrease, respectively. The speed of audio-track playback may be adjusted before or during audio-track playback. The foregoing method of adjusting a waveform display may be performed on DJ media player 140, on a general-purpose computer, or on another device.

Adjusting the speed of audio-track playback, such as by moving speed-fader 18, alters track-time indicators displayed on display 1. For example, increasing or decreasing the speed of playback decreases or increases, respectively, a remaining track-time (e.g., a playback-time) indicator. Increasing or decreasing the speed of playback decreases or increases, respectively, a total track-time (e.g., a time-length) indicator. The amount by which the track-time indicators are increased or decreased may be selected so as to allow the one or more track-time indicators to increment or decrement at the same rate as regular time-keeping clocks (e.g., at the rate they would increment or decrement before the speed of playback is altered). The track time displayed after playback-speed alteration is an adjusted track time. The speed of audio-track playback may be adjusted before or during audio-track playback. The foregoing method of adjusting the track playback time display and the track-time remaining display can be performed on DJ media player 140, on a general-purpose computer, or on another device.

Media player 140 has a slip-button 24. When slip-button 24 is pressed, a user may manipulate audio track playback on media player 140 (e.g., play the track in reverse, pause the track, repeat a looped portion of the track, create a scratching effect) and, when finished, resume regular playback from the audio-track location that the virtual audio playhead would have been at when regular playback was resumed if playback manipulation had not occurred. For example, if at second number 30 of an audio track a user pushes slip-button 24 and pauses the audio track for 10 seconds, the audio track will resume playback at second number 40 of the audio track rather than resuming from second number 30.

When slip-button 24 is pressed, a full waveform 910 of the audio track being displayed in display 1, as illustrated in FIG. 9A, is divided into two halves along a horizontal axis (e.g., creating a top half 900a and bottom half 900b). When a user manipulates the audio track's playback, such as by rotating platter 11 counter-clockwise to reverse the direction of playback, one half of the waveform represents the manipulated playback (e.g., scrolling, in reverse, bottom half 900b from the left side of display 1 to the right side of display 1). The other half of the waveform (e.g., top half 900a) continues to scroll from the right side of display 1 to the left side of display 1 as if no playback manipulation was occurring. This provides the user with a visual indication of what the audience will hear if the user ceases manipulating playback at a particular time while simultaneously allowing the user to see a visual representation of the manipulated playback the audience is currently hearing. For example, if the user wants to stop playing an audio track in reverse and resume regular playback as soon as a loud drum hit occurs in the track, the user may monitor the non-manipulated half-waveform 900a and end reverse playback when a large peak on the non-manipulated half-waveform 900a (e.g., corresponding to the loud drum hit) reaches the middle of display 1 or the virtual audio playhead. To indicate to the user which half-waveform is currently audible, the inaudible half-waveform may be greyed-out and/or the audible half-waveform may have its colors accented or highlighted. When regular playback is resumed, full waveform 910 of the now-audible half-wave 900a is displayed (e.g., the previously inaudible half-wave 900a is displayed in its full form). As an additional example, exemplary waveform 920 illustrated in FIG. 9B shows the waveform after slip button 24 is pressed and the playback manipulated. In some embodiments, measure numbers 920a, 920b, and 920c are displayed on the half-wave 900a before, while, or after it is inaudible. The foregoing method of displaying two half-waveforms during playback manipulation can be performed on DJ media player 140, on a general-purpose computer, or on another device. In some embodiments, a full waveform and half-waves may be scrolled from the top of a display to the bottom or from the bottom to the top. The full waveform may be divided into two halves along a vertical axis.

Media player 140 has eight loop-buttons 32. Pressing loop-button 32 a first time sets a point in an audio track for beginning a playback loop. Pressing the same loop-button 32 a second time sets a point in the audio track for ending the playback loop and automatically activates the repetition of the playback loop (i.e., activate the loop). In certain embodiments, pressing loop-button 32 will not automatically activate repetition of the playback loop. Pressing loop-button 32 a third time or while media player 140 is repeating an active playback loop stops the repetition of the playback loop (i.e., exit the loop). Pressing loop-button 32 a fourth time or after loop-button 32 was pressed to exit the loop reactivates repetition of the loop from the previously selected point for beginning the loop and to the previously selected point for ending the loop. Pressing loop-button 32 a fifth time ends the reactivated repetition of the loop. The loop start and end times or locations and the loop button 32 used to create the loop are saved as metadata (e.g., ID3 tags) associated with or added to the audio-track file, such that reloading a particular audio track on media player 140 allows recall of a previously created loop using the same loop button 32 without needing to recreate it. Different loops may be associated, respectively, with different loop buttons 32. In some embodiments, loops created and associated with a particular loop button 32 may be associated with a different loop button 32 instead or in addition to the loop button 32 used to create the loop. The foregoing method of creating playback loops can be performed on DJ media player 140, on a general-purpose computer, or on another device.

Figure 17A:
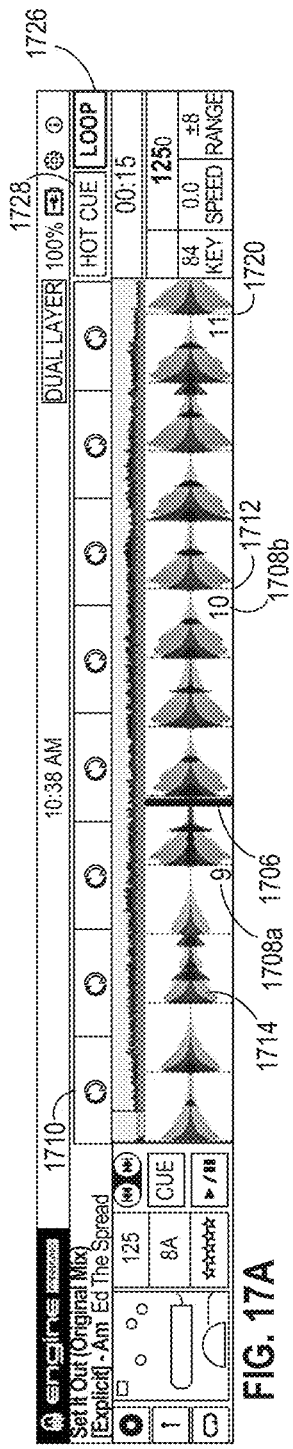
FIGS. 17A-17D illustrate exemplary displays in exemplary software implementations of certain embodiments of the present disclosure.
Figure 17B:
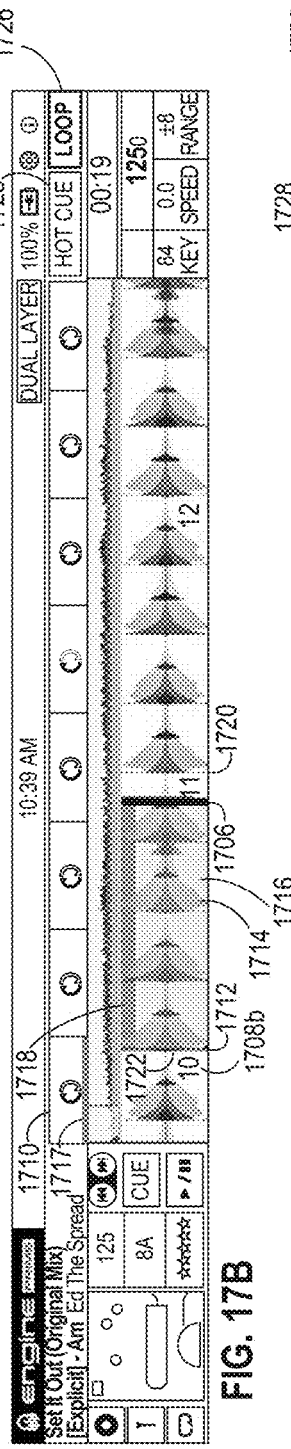
Figure 17C:
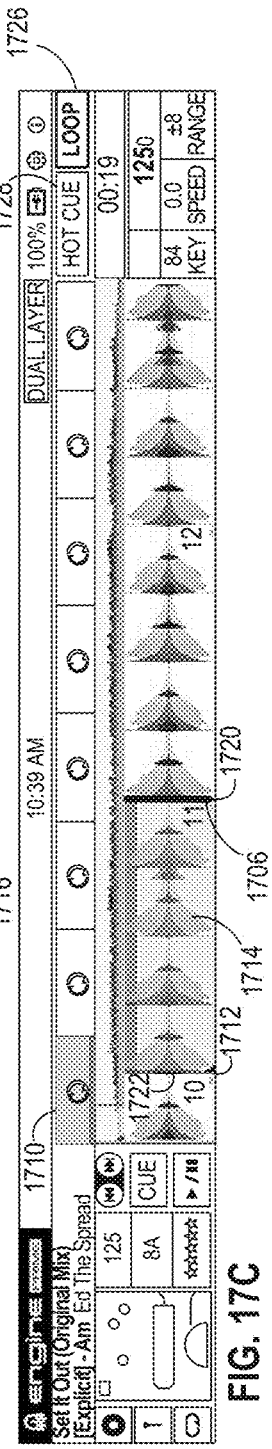
Figure 17D:
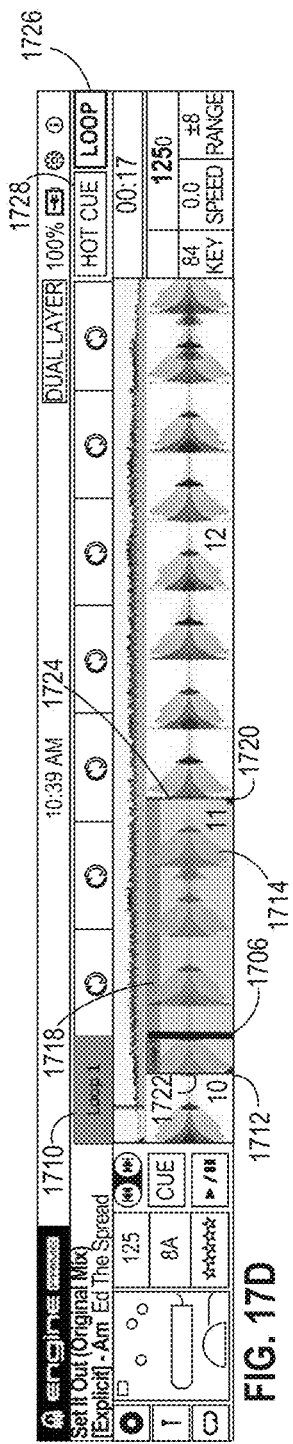

FIGS. 17A-D illustrate an exemplary user interface displayed when using the single-button loop feature. Virtual audio playhead 1706 is positioned between measures 9 and 10, as indicated by measure indicators 1708a and 1708b, respectively. Button 1710 is pressed or selected to set a loop start-point at the location of the virtual audio playhead 1706 when button 1710 is pressed. In some embodiments where the audio software with the single-button loop feature is implemented on a general-purpose computer, button 1710 may be selected using, for example, a mouse and/or a key on a keyboard. In some embodiments where the audio software with the single-button loop feature is implemented on a DJ media player, button 1710 may be selected using a physical button or a touchscreen display on the DJ media player (e.g., one or more loop buttons 32). In the example illustrated in FIGS. 17A-D, the loop start-point is at tenth measure 1712, which is the measure immediately to the right of measure indicator 1708b. A loop start-point marker 1722 of FIGS. 17B-D is displayed on waveform 1714 at the loop start-point location. As illustrated in FIG. 17B, waveform 1714 and/or waveform background 1716 are shaded differently at the portions of waveform 1714 that will be played back in a loop if a loop end-point is created at the virtual audio playhead's 1706 current position. In some embodiments, this comprises shading waveform 1714 and/or a portion of waveform background 1716 differently between the loop start-point and virtual audio playhead 1706 before a loop end-point is set. When a loop end-point is set, the shading of waveform 1714 and/or a portion of waveform background 1716 is different between the loop start-point and loop end-point. Once the loop start-point is created, the image of button 1710 is changed to indicate that the loop start-point has been created and, in some embodiments, that a loop end-point has not yet been created. As illustrated in FIG. 17B, this is accomplished by displaying a bar 1717 on button 1710. In some embodiments, the portion of waveform background 1716 is a shaded bar 1718.

If button 1710 is pressed a second time and this second press occurs when virtual audio playhead 1706 is at measure eleven 1720, as illustrated in FIG. 17C, measure eleven 1720 is set as the loop end-point. A loop end-point marker 1724 of FIG. 17D is displayed on waveform 1714 at the loop end-point location. The audio is looped between the loop start-point at measure ten 1712 and the loop end-point at measure eleven 1720, as illustrated in FIG. 17D. A name (e.g., "Loop 1") is generated for the loop. The name is displayed, for example, on button 1710 and/or on shaded bar 1718, as illustrated in FIG. 17D.

In some embodiments, metadata is added to the audio file for the track in which the loop was created to associate the created loop with the audio file. This metadata may be added to the audio file when the loop is created (e.g., the second time loop button 32 is pressed). The metadata comprises information that is used to recreate the loop if the audio file is reloaded for playback. For example, the metadata comprises the loop start-point, loop end-point, loop name, and/or button assignment (e.g., the button to which the loop is assigned). The software used to playback an audio track assigns loops associated with a loaded audio track to buttons in accordance with information contained in metadata associated with the audio track. In some embodiments, a separate file containing the audio data that is looped is not created.

The looped playback continues until button 1710 is pressed a third time. During loop playback, the shading of shaded bar 1718 behind virtual audio playhead 1706 is different from the shading of bar 1718 in front of virtual audio playhead 1706. Pressing button 1710 a third time during loop playback causes virtual playhead 1706 to proceed from its location when button 1710 was pressed a third time to the loop end-point by traversing intervening portions of the audio track and continue moving beyond the loop end-point. In some embodiments, virtual playhead 1706 will jump from its location when button 1710 is pressed a third time to the loop end-point and continue moving beyond the loop end-point.

Pressing button 1710 a fourth time causes looped playback of audio between the loop start-point and loop end-point to be reinitiated. Pressing button 1710 a fifth time causes the looped playback to end (e.g., an exit from the loop).

It is to be understood that, in some embodiments, the selection of a loop start-point, selection of a loop end-point, exiting a loop, and/or entering a loop may occur at the moment button 1710 is released after being pressed in addition to or instead of at the moment button 1710 is pressed. For example, a loop start-point may be created at the moment button 1710 is pressed a first time and a loop end-point may be created at the moment button 1710 is released a first time. Button 1710 may be held down continuously between the creation of a loop start-point and a loop end-point, creating the loop end-point at the location where button 1710 is released after the first press. In this case, what has previously been referred to as a third press is a second press, what has been referred to as a fourth press is a third press, and what has been referred to as a fifth press is a fourth press. In an embodiment, a loop end-point is created after releasing button 1710 from a second press. The display of button 1710 may be shaded differently while button 1710 is pressed and before it is released, as illustrated in FIGS. 17B and 17C.

Button 1710 is used for the single-button loop feature discussed above. In some embodiments, button 1710 is used for the single-button loop feature or to set a cue point. For example, if loop button 1726 is pressed before button 1710, button 1710 can be used for the single-button loop feature. If hot cue button 1728 is pressed before button 1710, button 1710 can be used to set a cue point.

Playback loops may be configured with auto-loop knob 33 on media player 140. Auto-loop knob 33 is rotated to set the length of a loop (e.g., one quarter-note or half of a second). The set length of the loop is displayed on display 1, platter display 11a, or both. The loop is activated by pressing auto-loop knob 33 and deactivated by pressing auto-loop knob 33 again. An activated loop may be shifted forward or backward by an amount set by rotating auto-loop knob 33 while the loop is active. The amount is set by rotating auto-loop knob 33 until the display 1 and/or platter display 11a shows the desired amount. The foregoing method of creating playback loops can be performed on DJ media player 140, on a general-purpose computer, or on another device.

The virtual audio playhead may be shifted backwards or forward by a fixed amount. This is accomplished by first rotating a knob, such as auto-loop knob 33, until a desired amount to shift the virtual audio playhead by is displayed on display 1 and/or platter display 11a (e.g., one quarter note or half a second). Second, a forward beat-jump button 34a or backward beat-jump button 34b is pressed to move the virtual audio playhead by the fixed amount forward or backward, respectively.

Figure 16:
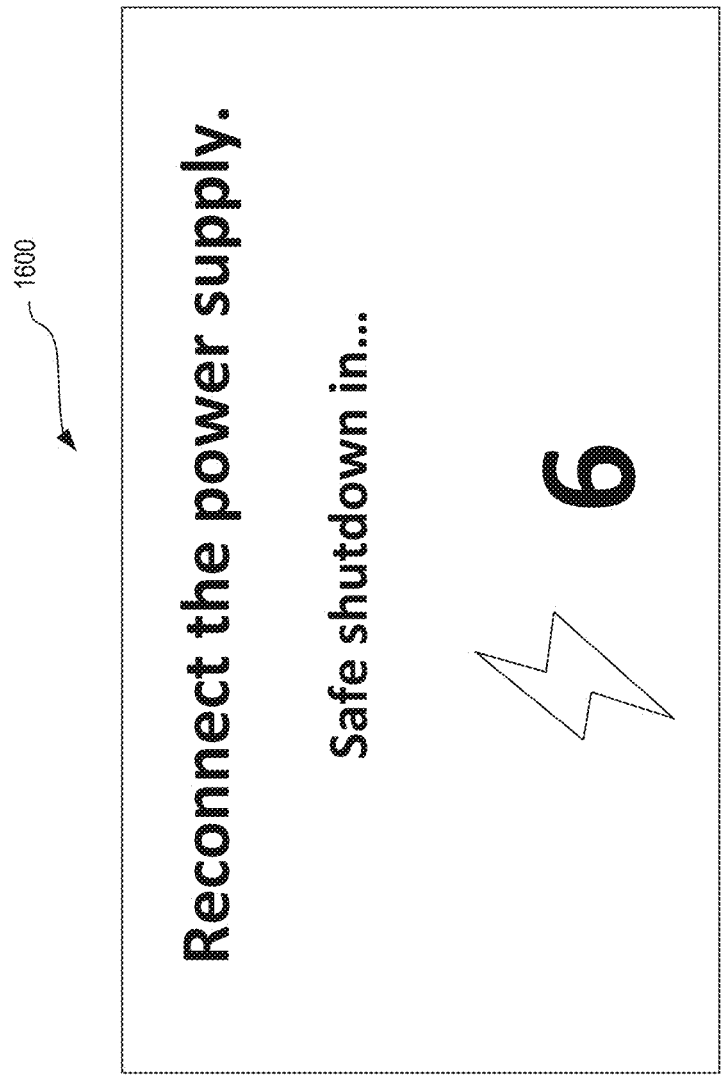
FIG. 16 illustrates another exemplary display.

Media player 140 has an internal procedure for reacting to a full or partial power failure. For example, media player 140 comprises one or more capacitors or other energy-storing elements that provide media player's 140 components with power if electricity supplied to media player 140 is inadequate (e.g., during an external power failure due to a tripped circuit protector or an inadvertently pulled power cord). When there is a disruption of electric current or potential, one or more energy-storing elements provide power long enough for display 1 to present a notification to the user that a shutdown will occur within a certain amount of time and/or present a count-down timer until shutdown begins. For example, the system may present exemplary display 1600 illustrated in FIG. 16. The notification may comprise a gauge indicating an amount of energy left in the energy-storing elements (e.g., an amount of energy or a portion of energy, such as 50% of the total energy previously available). The energy-storing elements may be one or more capacitors and/or other devices. A capacitor-charging circuit maintains the capacitor voltage at a level that is lower than the normal operating voltage for the system. A processor within media player 140 monitors the voltage it is supplied and, upon sensing that the voltage has changed from the normal operating voltage, initiates the notification and shut-down procedures. The processor determines the rate at which the voltage is dropping and starts the count-down timer display from a particular time based on how long the system has until it must perform a safe shutdown. The system initiates a shutdown procedure if normal operating voltage is not restored (e.g., by reconnecting a disconnected power cable) within the amount of time indicated by the count-down timer. In certain embodiments, the system initiates a shutdown procedure if it senses the voltage dropped below a certain threshold. Such threshold may be, for example, the minimum voltage at which the system can properly operate or perform a reduced number of functions. Energy-storing elements provide enough power so that audio tracks can continue playing some time after the power failure, such as in the time between a voltage drop and the initiation of the safe shutdown procedure or the time necessary to finish playing the currently playing song. The system may safely shut down in a manner that prevents file or system corruption, such as by stopping the reading of or writing to a file, properly saving a File Allocation Table on a hard disk or other medium within or without the media player 140, properly saving core file system blocks, and/or properly saving file-header blocks of one or more open files.

Figure 10:
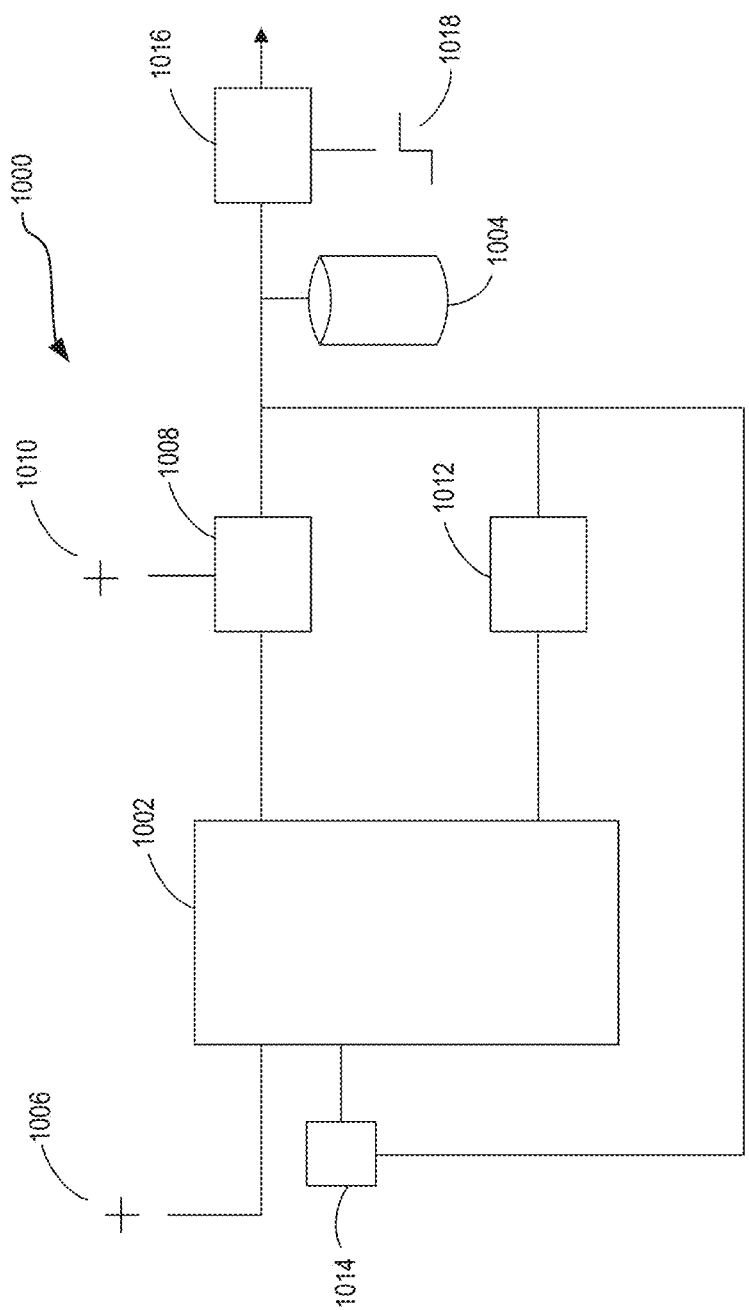
FIG. 10 illustrates an exemplary hardware configuration.

An internal procedure for reacting to a full or partial power failure may, in some embodiments, be implemented by an exemplary hardware configuration 1000 illustrated in FIG. 10. Hardware configuration 1000 comprises a capacitor-charging controller 1002 ("controller 1002") that controls when a capacitor 1004 is being charged. In certain embodiments, capacitor 1004 is a plurality of capacitors or one or more other energy-storing devices. Controller 1002 is powered by a power source 1006. Controller 1002 operates a hardware component 1008 to supply power from power source 1010 to capacitor 1004. In certain embodiments power source 1006 is the same as power source 1010. In certain embodiments, hardware component 1008 is multiple components. For example, hardware component 1008 may be a pair of transistors that operate in a switched mode. Hardware configuration 1000 comprises a hardware component 1012 that sets the electric potential at which controller 1002 will maintain capacitor 1004. In certain embodiments, hardware component 1012 is a voltage-divider circuit that uses a first reference voltage from controller 1002 to set capacitor's 1004 electric potential. Hardware configuration 1000 comprises hardware component 1014 that enables or disables controller 1002. In certain embodiments, hardware component 1014 comprises a comparator circuit that compares a voltage derived from the electric potential at capacitor 1004 to the first or a second reference voltage. For example, if the electric potential at capacitor 1004 is less than the electric potential set by hardware component 1012 but within a tolerable margin of the electric potential set by hardware component 1012, hardware component 1014 may disable controller 1002 from charging capacitor 1004. Hardware configuration 1000 comprises hardware component 1016 that controls whether current flows from capacitor 1004 to other hardware within media player 140. In certain embodiments, hardware component 2016 receives a logic signal 1018 to permit current to flow from capacitor 1004 to other hardware within media player 140, such as a processor. Logic signal 1018 is sent from a device that is aware of whether a safe-shutdown procedure should be initiated.

It is to be understood in the foregoing description that the term "hardware component" may refer to a plurality of physical devices or components or to a single physical device or component.

Certain embodiments of the present disclosure can be implemented as software on a general-purpose computer or on another device.

It is to be understood that different styles of shading or shading patterns used in the figures may represent different colors, different styles of shading, or different shading patterns.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium storing instructions executable by at least one processor to facilitate generating a visual color display of audio-file data according to a method, the method comprising:
   acquiring audio-file data processed by one or more different frequency bands;
   generating, from the acquired audio-file data, one or more subsidiary waveforms, wherein each of the one or more subsidiary waveforms corresponds to one or more of the frequency bands; and
   displaying a composite waveform comprising a composite visualization of multiple subsidiary waveforms, wherein each of the multiple subsidiary waveforms has a different color and is simultaneously visually discernable within the composite visualization from other of the multiple subsidiary waveforms within the composite visualization.

2. The non-transitory computer-readable medium of claim 1, wherein the method further comprises downsampling one or more waveforms.

3. The non-transitory computer-readable medium of claim 1, wherein the method further comprises processing one or more waveforms through an envelope detector.

4. The non-transitory computer-readable medium of claim 1, wherein the method further comprises processing one or more waveforms through an expander and applying a gain factor.

5. The non-transitory computer-readable medium of claim 1, wherein the method further comprises processing one or more waveforms through any of a bandpass, high-pass or low-pass filter.

6. The non-transitory computer-readable medium of claim 1, wherein at least one of the different frequency bands comprises substantially bass-drum audio data.

7. The non-transitory computer-readable medium of claim 1, wherein at least one of the subsidiary waveforms has one or more transparency levels at waveform sections thereof that are proportional or inversely proportional to amplitudes of the waveform sections within the at least one subsidiary waveform.

8. A method for generating a visual color display of audio-file data comprising:
   acquiring audio-file data processed by one or more different frequency bands;
   generating, from the acquired audio-file data, one or more subsidiary waveforms, wherein each of the one or more subsidiary waveforms corresponds to one or more of the frequency bands; and
   displaying, on a display, a composite waveform comprising a composite visualization of multiple subsidiary waveforms, wherein each of the multiple subsidiary waveforms has a different color and is simultaneously visually discernable within the composite visualization from other of the multiple subsidiary waveforms within the composite visualization.

9. The method of claim 8, wherein at least one of the different frequency bands comprises substantially all bass-drum audio.

10. The method of claim 8, wherein at least one of the subsidiary waveforms has one or more transparency levels at waveform sections thereof that are proportional or inversely proportional to amplitudes of the waveform sections within the at least one subsidiary waveform.

11. A system comprising a processor, a display, and a non-transitory computer-readable storage medium storing instruction that, when executed by the processor, cause the processor to perform a method for generating a visual color image on the display of audio-file data; the method comprising:
   acquiring audio-file data processed by one or more different frequency bands;
   generating, from the acquired audio-file data; one or more subsidiary waveforms; wherein each of the one or more subsidiary waveforms corresponds to one or more of the frequency bands; and
   displaying a composite waveform comprising a composite visualization of multiple subsidiary waveforms, wherein each of the multiple subsidiary waveforms has a different color and is simultaneously visually discernable within the composite visualization from other of the multiple subsidiary waveforms within the composite visualization.

12. The system of claim 11, wherein at least one of the different frequency bands comprises substantially all bass-drum audio.

13. The system of claim 11, wherein at least one of the subsidiary waveforms has one or more transparency levels at waveform sections thereof that are proportional or inversely proportional to amplitudes of the waveform sections within the at least one subsidiary waveform.

14. A non-transitory computer-readable medium storing instructions executable by at least one processor to facilitate generating a visual color display of audio-file data according to a method, the method comprising:
   acquiring audio-file data processed by one or more different frequency bands;
   generating, from the acquired audio-file data, one or more subsidiary waveforms, wherein each of the one or more subsidiary waveforms corresponds to one or more of the frequency bands; and
   displaying a composite waveform comprising a composite visualization of multiple subsidiary waveforms, wherein each of the multiple subsidiary waveforms has a different color and at least one of the subsidiary waveforms has one or more transparency levels at waveform sections thereof that vary dynamically according to a characteristic of the waveform sections.

15. The non-transitory computer-readable medium of claim 14, wherein each of the multiple subsidiary waveforms is simultaneously visually discernable within the composite visualization from other of the multiple subsidiary waveforms within the composite visualization.

16. The non-transitory computer-readable medium of claim 14, wherein the characteristic of the waveform sections is amplitude.

17. The non-transitory computer-readable medium of claim 14 wherein the transparency levels at waveform sections are proportional or inversely proportional to amplitudes of the waveform sections within the at least one subsidiary waveform.

18. A method for generating a visual color display of audio-file data comprising:
    acquiring audio-file data processed by one or more different frequency bands;
    generating, from the acquired audio-file data, one or more subsidiary waveforms, wherein each of the one or more subsidiary waveforms corresponds to one or more of the frequency bands; and
    displaying a composite waveform comprising a composite visualization of multiple subsidiary waveforms, wherein each of the multiple subsidiary waveforms has a different color and at least one of the subsidiary waveforms has one or more transparency levels at waveform sections thereof that vary dynamically according to a characteristic of the waveform sections.

19. The method of claim 18, wherein each of the multiple subsidiary waveforms is simultaneously visually discernable within the composite visualization from other of the multiple subsidiary waveforms within the composite visualization.

20. The method of claim 18 wherein the transparency levels at waveform sections are proportional or inversely proportional to amplitudes of the waveform sections within the at least one subsidiary waveform.

21. A system comprising a processor, a display, and a non-transitory computer-readable storage medium storing instruction that, when executed by the processor, cause the processor to perform a method for generating a visual color image on the display of audio-file data, the method comprising:
    acquiring audio-file data processed by one or more different frequency bands;
    generating one or more waveforms wherein each of the one or more waveforms corresponds to the one or more filtered-audio data; and
    displaying a composite waveform comprising a composite visualization of multiple subsidiary waveforms, wherein each of the multiple subsidiary waveforms has a different color and at least one of the subsidiary waveforms has one or more transparency levels at waveform sections thereof that vary dynamically according to a characteristic of the waveform sections.

22. The system of claim 21, wherein each of the multiple subsidiary waveforms is simultaneously visually discernable within the composite visualization from other of the multiple subsidiary waveforms within the composite visualization.

23. The system of claim 21 wherein the transparency levels at waveform sections are proportional or inversely proportional to amplitudes of the waveform sections within the at least one subsidiary waveform.

* * * * *